United States Patent
Tooher et al.

(10) Patent No.: US 12,445,233 B2
(45) Date of Patent: Oct. 14, 2025

(54) METHODS AND APPARATUS FOR PUSCH REPETITION

(71) Applicant: INTERDIGITAL PATENT HOLDINGS, INC., Wilmington, DE (US)

(72) Inventors: Patrick Tooher, Montreal (CA); Faris Alfarhan, Montreal (CA); Dylan Watts, Montreal (CA); Paul Marinier, Brossard (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/283,064

(22) PCT Filed: Mar. 28, 2022

(86) PCT No.: PCT/US2022/022175
§ 371 (c)(1),
(2) Date: Sep. 20, 2023

(87) PCT Pub. No.: WO2022/212275
PCT Pub. Date: Oct. 6, 2022

(65) Prior Publication Data
US 2024/0171326 A1 May 23, 2024

Related U.S. Application Data

(60) Provisional application No. 63/167,953, filed on Mar. 30, 2021, provisional application No. 63/185,576, filed on May 7, 2021.

(51) Int. Cl.
*H04L 1/1867* (2023.01)
*H04W 74/0808* (2024.01)

(52) U.S. Cl.
CPC ............ *H04L 1/189* (2013.01); *H04L 1/1887* (2013.01); *H04L 1/1896* (2013.01); *H04W 74/0808* (2013.01)

(58) Field of Classification Search
CPC ... H04W 28/04; H04W 72/04; H04W 72/042; H04W 88/08; H04W 74/0808;
(Continued)

(56) References Cited

U.S. PATENT DOCUMENTS

| 11,627,605 B2 * | 4/2023 | Loehr | H04L 1/1887 |
| | | | 370/329 |
| 11,638,300 B2 * | 4/2023 | Zhang | H04W 72/23 |
| | | | 370/329 |

(Continued)

FOREIGN PATENT DOCUMENTS

| WO | WO 2022/234549 A1 * | 11/2002 | H04W 72/12 |
| WO | 2020144346 A1 | 7/2020 | |
| WO | 2022212275 A1 | 10/2022 | |

OTHER PUBLICATIONS

3GPP TSG RAN WG1 #103-e, e-Meeting, Oct. 26-Nov. 13, 2020, R1-2008729, Source: Wilus Inc., Title: Discussion on potential techniques for PUSCH coverage enhancement, Agenda item: 8.8.2.1. (Year: 2020).*

(Continued)

*Primary Examiner* — Peter G Solinsky
*Assistant Examiner* — Sanjay K Dewan
(74) *Attorney, Agent, or Firm* — Volpe Koenig

(57) ABSTRACT

A method and apparatus for performing a channel access procedure and transmitting a set of repetitions is disclosed. A wireless transmit/receive unit (WTRU) may be configured to receive information to transmit uplink data. The information may indicate a first number of nominal repetitions and a first number of symbols for each of the first number of nominal repetitions. The WTRU may be configured to
(Continued)

determine a set of symbols associated with a first nominal repetition and to transmit a second number of actual repetitions in symbols associated with the first nominal repetition. The second number of actual repetitions and the symbols used to transmit the second number of actual repetitions may be based on an occurrence of an event during the set of symbols associated with the first nominal repetition. The set of symbols associated with the first nominal repetition may comprise one or more subsets of consecutive uplink symbols.

20 Claims, 12 Drawing Sheets

(58) Field of Classification Search
CPC ..... H04L 5/0007; H04L 1/189; H04L 1/1887; H04L 1/1896
USPC .......................................................... 370/329
See application file for complete search history.

(56) References Cited

U.S. PATENT DOCUMENTS

| | | | |
|---|---|---|---|
| 11,646,832 | B2 | 5/2023 | Rastegardoost et al. |
| 11,658,789 | B2 | 5/2023 | Myung et al. |
| 11,671,981 | B2 | 6/2023 | Liu et al. |
| 11,695,532 | B2 | 7/2023 | Li et al. |
| 11,696,329 | B2 * | 7/2023 | Xu .......................... H04L 1/187 370/329 |
| 11,706,800 | B2 | 7/2023 | Sun et al. |
| 11,751,251 | B2 | 9/2023 | Li et al. |
| 2013/0028213 | A1 * | 1/2013 | Ko ........................ H04L 1/1614 370/329 |
| 2020/0367208 | A1 * | 11/2020 | Khoshnevisan ...... H04W 72/23 |
| 2023/0083914 | A1 * | 3/2023 | Nammi ..................... H04L 5/16 370/329 |
| 2023/0085403 | A1 * | 3/2023 | Luo ....................... H04W 40/22 370/329 |
| 2023/0091023 | A1 * | 3/2023 | Myung ............. H04W 74/0816 370/329 |
| 2023/0092921 | A1 | 3/2023 | Chin et al. |
| 2023/0141989 | A1 * | 5/2023 | Bagheri ................ H04W 72/23 370/329 |
| 2023/0146487 | A1 * | 5/2023 | Chien ................. H04W 74/006 370/329 |
| 2023/0156681 | A1 | 5/2023 | Tooher et al. |
| 2023/0224095 | A1 * | 7/2023 | Bae ....................... H04L 1/1854 370/329 |
| 2023/0239917 | A1 * | 7/2023 | Karaki .................. H04W 74/02 370/329 |

OTHER PUBLICATIONS

3GPP TSG RAN WG1 #103-e, e-Meeting, Oct. 26-Nov. 13, 2020, R1-2008730, Source: Wilus Inc., Title: Discussion on potential techniques for PUCCH coverage enhancement, Agenda item: 8.8.2.2. (Year: 2020).*
3GPP TSG RAN WG1 Meeting #104-e, e-Meeting, Jan. 25-Feb. 5, 2021, R1-2100103, Source: ZTE, Title: Discussion on unlicensed band URLLC/IIoT, Agenda item: 8.3.2. (Year: 2021).*
3GPP TS 37.213 v16.4.0 (Dec. 2020), Technical Specification, 3rd Generation Partnership Project; Technical Specification Group Radio Access Network; Physical layer procedures for shared spectrum channel access (Release 16). (Year: 2020).*
IEEE Standard for Information technology—Telecommunications and information exchange between system—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
Interdigital, Inc., "Enhancements for unlicensed band URLLC/IIoT," 3GPP TSG RAN WG1 #104bis-e, R1-2103201, Electronic meeting (Apr. 2021).
Interdigital, Inc., "Enhancements for unlicensed band URLLC/IIoT," 3GPP TSG RAN WG1 #106bis-e, R1-2107640, e-Meeting (Aug. 16-27, 2021).
Interdigital, Inc., "Enhancements for unlicensed band URLLC/IIoT," 3GPP TSG RAN WG1 #106bis-e, R1-2109894, e-Meeting (Oct. 11-19, 2021).
Nokia et al., "Revised WID: Enhanced Industrial Internet of Things (IoT) and ultra-reliable and low latency communication (URLLC) support for NR," 3GPP TSG RAN Meeting #88e, RP-201310, Electronic meeting (Jun. 29-Jul. 3, 2020).
Third Generation Partnership Project, "Technical Specification Group Radio Access Network; NR; Physical layer procedures for control (Release 16)," 3GPP TS 38.213 V16.4.0 (Dec. 2020).
Third Generation Partnership Project, "Technical Specification Group Radio Access Network; NR; Physical layer procedures for control (Release 16)," 3GPP TS 38.213 V16.8.0 (Dec. 2021).
Third Generation Partnership Project, "Technical Specification Group Radio Access Network; NR; Physical layer procedures for control (Release 17)," 3GPP TS 38.213 V17.0.0 (Dec. 2021).
Third Generation Partnership Project, "Technical Specification Group Radio Access Network; NR; Physical layer procedures for data (Release 16)," 3GPP TS 38.214 V16.8.0 (Dec. 2021).
Third Generation Partnership Project, "Technical Specification Group Radio Access Network; NR; Physical layer procedures for data (Release 17)," 3GPP TS 38.214 V17.0.0 (Dec. 2021).
Third Generation Partnership Project, "Technical Specification Group Radio Access Network; NR; Physical layer procedures for data (Release 16)," 3GPP TS 38.214 V16.4.0 (Dec. 2020).
Third Generation Partnership Project, "Technical Specification Group Radio Access Network; NR; Radio Resource Control (RRC) protocol specification (Release 16)," 3GPP TS 38.331 V16.3.1 (Jan. 2021).
Third Generation Partnership Project, "Technical Specification Group Radio Access Network; NR; Radio Resource Control (RRC) protocol specification (Release 16)," 3GPP TS 38.331 V16.7.0 (Dec. 2021).
Third Generation Partnership Project, "Technical Specification Group Radio Access Network; Physical layer procedures for shared spectrum channel access (Release 17)," 3GPP TS 37.213 V17.0.0 (Dec. 2021).
Third Generation Partnership Project, "Technical Specification Group Radio Access Network; Physical layer procedures for shared spectrum channel access (Release 16)," 3GPP TS 37.213 V16.3.0 (Sep. 2020).

(56) References Cited

OTHER PUBLICATIONS

Third Generation Partnership Project, "Technical Specification Group Radio Access Network; Physical layer procedures for shared spectrum channel access (Release 16)," 3GPP TS 37.213 V16.4.0 (Dec. 2020).

Third Generation Partnership Project, "Technical Specification Group Radio Access Network; Physical layer procedures for shared spectrum channel access (Release 16)," 3GPP TS 37.213 V16.7.0 (Dec. 2021).

Wilus Inc., "Discussion on potential techniques for PUCCH coverage enhancement," 3GPP TSG RAN WG1 Meeting #103-e, R1-2008730, e-Meeting (Oct. 26-Nov. 13, 2021).

Wilus Inc., "Discussion on potential techniques for PUSCH coverage enhancement," 3GPP TSG RAN WG1 Meeting #103-e, R1-2008729, e-Meeting (Oct. 26-Nov. 13, 2021).

ZTE, "Discussion on unlicensed band URLLC/IIoT," 3GPP TSG RAN WG1 Meeting #104-e, R1-2100103, e-Meeting (Jan. 25-Feb. 5, 2021).

Apple Inc., "Orphan symbol treatment in unlicensed spectrum access," 3GPP TSG-RAN WG1 Meeting #104-e, R1-2101382, e-Meeting (Jan. 25-Feb. 5, 2021).

NTT Docomo, Inc., "Discussion on enhancements for unlicensed band URLLC," 3GPP TSG RAN WG1 #102-e, R1-2006730, e-Meeting (Aug. 17-28, 2020).

Samsung, "Enhancements for unlicensed band URLLC/IIoT," 3GPP TSG RAN WG1 #104-e, R1-2101203, e-Meeting (Jan. 25-Feb. 5, 2021).

\* cited by examiner

METHODS AND APPARATUS FOR PUSCH REPETITION

CROSS-REFERENCE TO RELATED APPLICATIONS

This application is the U.S. National Stage, under 35 U.S.C. § 371, of International Application No. PCT/US2022/022175 filed Mar. 28, 2022, which claims the benefit of U.S. Provisional Application No. 63/167,953, filed Mar. 30, 2021, and U.S. Provisional Application No. 63/185,576, filed May 7, 2021, the contents of which are incorporated herein by reference.

BACKGROUND

Different types of physical uplink shared channel (PUSCH) repetition are defined. Repetition Type A enables a single repetition per slot. Enhanced repetition Type A for 5G New Radio for unlicensed spectrum (NR-U) enables multiple repetitions per slot, but with a fixed mapping over all slots. Repetition Type B enables sub-slot repetitions by using nominal repetitions. Multi-TTI scheduling has benefits such as reducing the amount of scheduling signaling. Furthermore, multi-TTI scheduling may reduce the need for listen-before-talk (LBT) prior to every transmission if every PUSCH maps to a full slot. Methods and apparatus are needed to enable sub-slot repetitions in an unlicensed environment and to enable multi-TTI scheduling with repetitions.

SUMMARY

A wireless transmit/receive unit (WTRU) may be configured to receive information to transmit uplink data. The uplink data may be transmitted over a PUSCH. The information may indicate a first number of nominal repetitions and a first number of symbols for each of the first number of nominal repetitions. The WTRU may be configured to determine a set of symbols associated with a first nominal repetition. The WTRU may be configured to transmit a second number of actual repetitions in symbols associated with the first nominal repetition. The second number of actual repetitions and the symbols used to transmit the second number of actual repetitions may be based on an occurrence of an event during the set of symbols associated with the first nominal repetition. The event may be at least one of: a channel occupancy time (COT) end, channel access resources, channel access procedure outcome, a fixed frame period (FFP) idle period start time, or FFP idle period end time. The set of symbols associated with the first nominal repetition may comprise one or more subsets of consecutive uplink symbols. At least one of the one or more subsets of consecutive uplink symbols may comprise at least two symbols. One subset of the one or more subsets of consecutive uplink symbols may not overlap with another subset of the one or more subsets of consecutive uplink symbols. On a condition that the event occurs during the set of symbols associated with the first nominal repetition, the WTRU may be configured to transmit a first actual repetition in one or more uplink symbols of the one or more subsets of consecutive uplink symbols prior to the occurrence of the event and on a condition that a channel access procedure is successful, transmit a second actual repetition after transmission of the first actual repetition in one or more uplink symbols of the one or more subsets of consecutive uplink symbols after the occurrence of the event. The first actual repetition may not be transmitted in a symbol after the event. The channel access procedure may be a listen-before-talk (LBT) procedure. The channel access procedure may be based on at least one of: channel occupancy time (COT) timing, an initiator of a COT, a fixed frame period (FFP) timing, a previous channel access procedure outcome, whether a gap precedes a repetition, a size of a gap between repetitions, or a cause of a gap between repetitions. An actual repetition of the second number of actual repetitions may comprise at least one of: a configured grant-uplink control information (CG-UCI), a demodulation reference signal (DM-RS), a scheduling request (SR), a channel state information (CSI), a hybrid automatic repeat request (HARQ) acknowledgement (ACK), or a transport block (TB). The WTRU may be configured to receive configuration information regarding resources to perform the channel access procedure. The resources may comprise at least one of: a set of time instances, a set of frequency regions, or a beam.

A WTRU may be configured to determine when to perform a channel access procedure. The determination of when to perform the channel access procedure may be based on at least one of: a repetition number, a size of a gap between repetitions, a cause of a gap between repetitions, a frequency hopping, a beam change, a channel occupancy time (COT) timing, whether the COT is user initiated or network initiated, fixed frame period (FFP) timing, or a previous channel access procedure outcome. The WTRU may be configured to receive an indication of a set of invalid resources. The set of invalid resources may not be used for transmitting a set of repetitions. The indication may comprise information regarding a channel access type to use for resuming transmission. The WTRU may be configured to receive a semi-static configuration of a channel access type to use for resuming transmission. The indication of a set of invalid resources may be received in a downlink control information (DCI). The WTRU may be configured to receive configuration information regarding resources for performing LBT. The resources may comprise at least one of: a set of time instances, a set of frequency regions, or a beam. A repetition may be associated with a set of possible start times. The WTRU may be configured to determine that a channel is idle and transmit a repetition at a first start time. The WTRU may be configured to determine that a channel is busy and perform a second LBT procedure prior to a second start time. The WTRU may be configured to send an indication of which LBT procedure was successful for the transmission of the repetition. The WTRU may be configured to receive configuration information indicating a set of nominal repetitions, determine a set of symbols over which a nominal repetition may occur, and determine whether the set of symbols over which a nominal repetition may occur is valid. The determination of whether the set of symbols over which a nominal repetition may occur is valid may be based on at least one of: whether LBT is required prior to a repetition, COT boundary timing, FFP idle period timing, or a prior LBT outcome. The WTRU may be configured to segment a nominal repetition on a condition that the nominal repetition includes one or more invalid symbols in the nominal repetition. The WTRU may be configured to determine an LBT type to use prior to a repetition. The determination of an LBT type to use may be based on at least one of: COT timing, a COT indicator, a COT status, a gap size, a cause of a gap, or whether transmission is for a different TB than a preceding repetition transmission. A repetition transmission may include at least one of: CG-UCI, DM-RS, UCI, or TB. The WTRU may be configured to skip, cancel, or postpone a repetition on a condition that an LBT failure occurs. The WTRU may be configured to receive configuration information that indicates resources on which to transmit a plurality of transport blocks. The WTRU may be configured to transmit all repetitions of a TB before transmitting repetitions of another TB. The WTRU may be configured to transmit all first repetitions of all TBs before transmitting second repetitions of the TBs. The WTRU may be configured to receive configuration information regarding LBT bandwidth frequency hopping pattern information. The WTRU may be configured to perform frequency hopping between transmission of repetitions.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
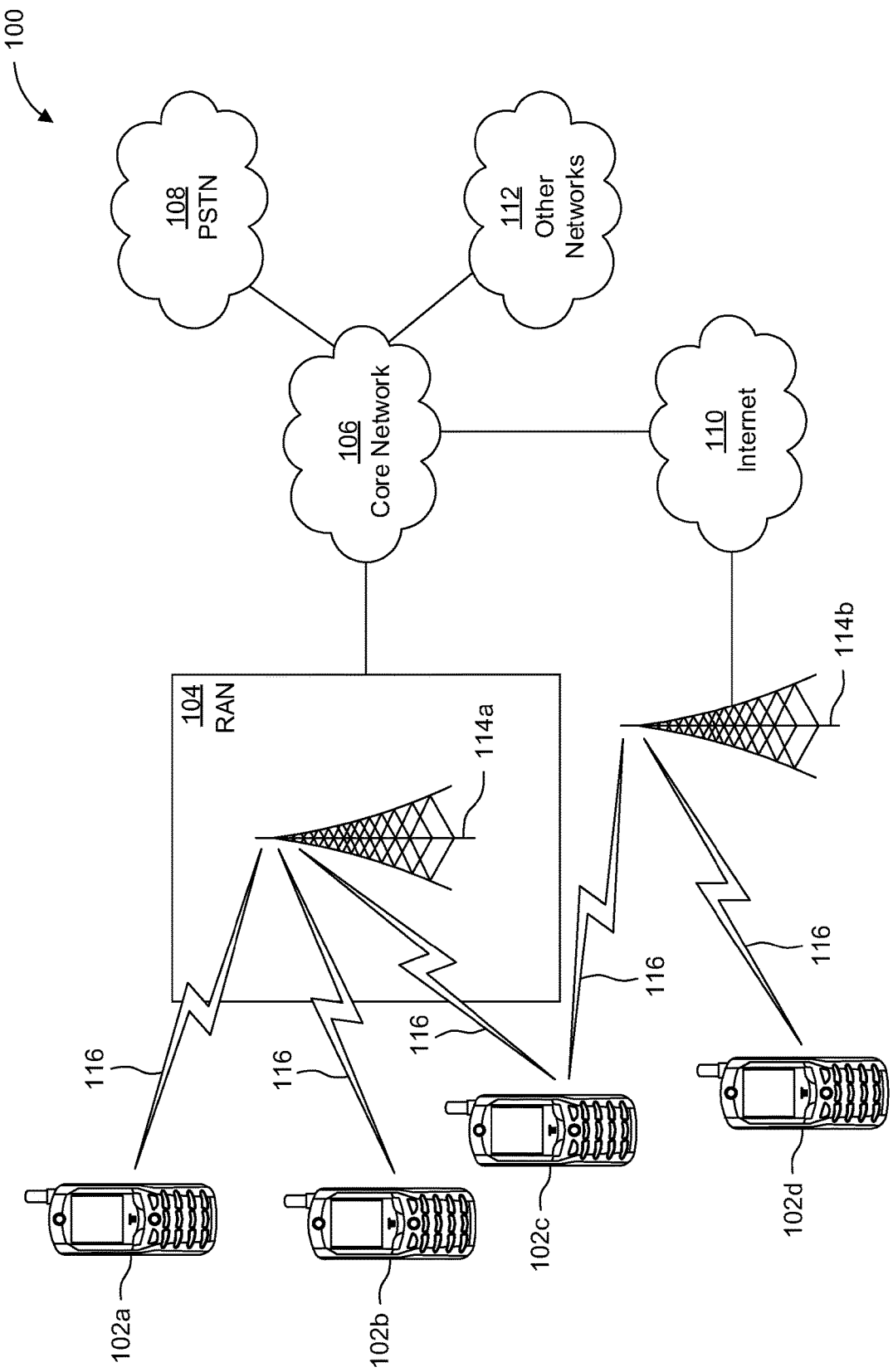
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
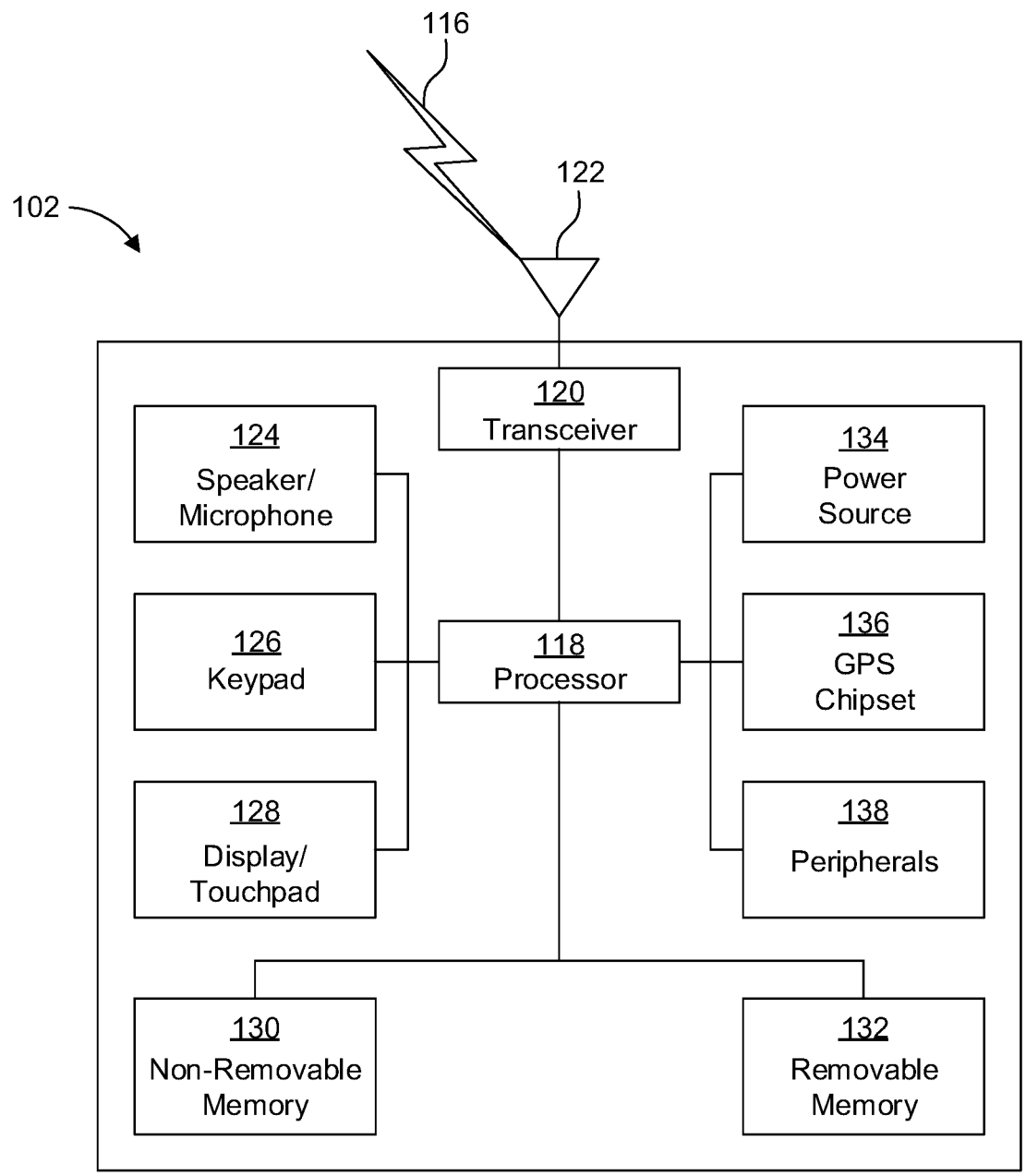
FIG. 1B is a system diagram illustrating an example wireless transmit/receive unit (WTRU) that may be used within the communications system illustrated in FIG. 1A according to an embodiment.
Figure 1C:
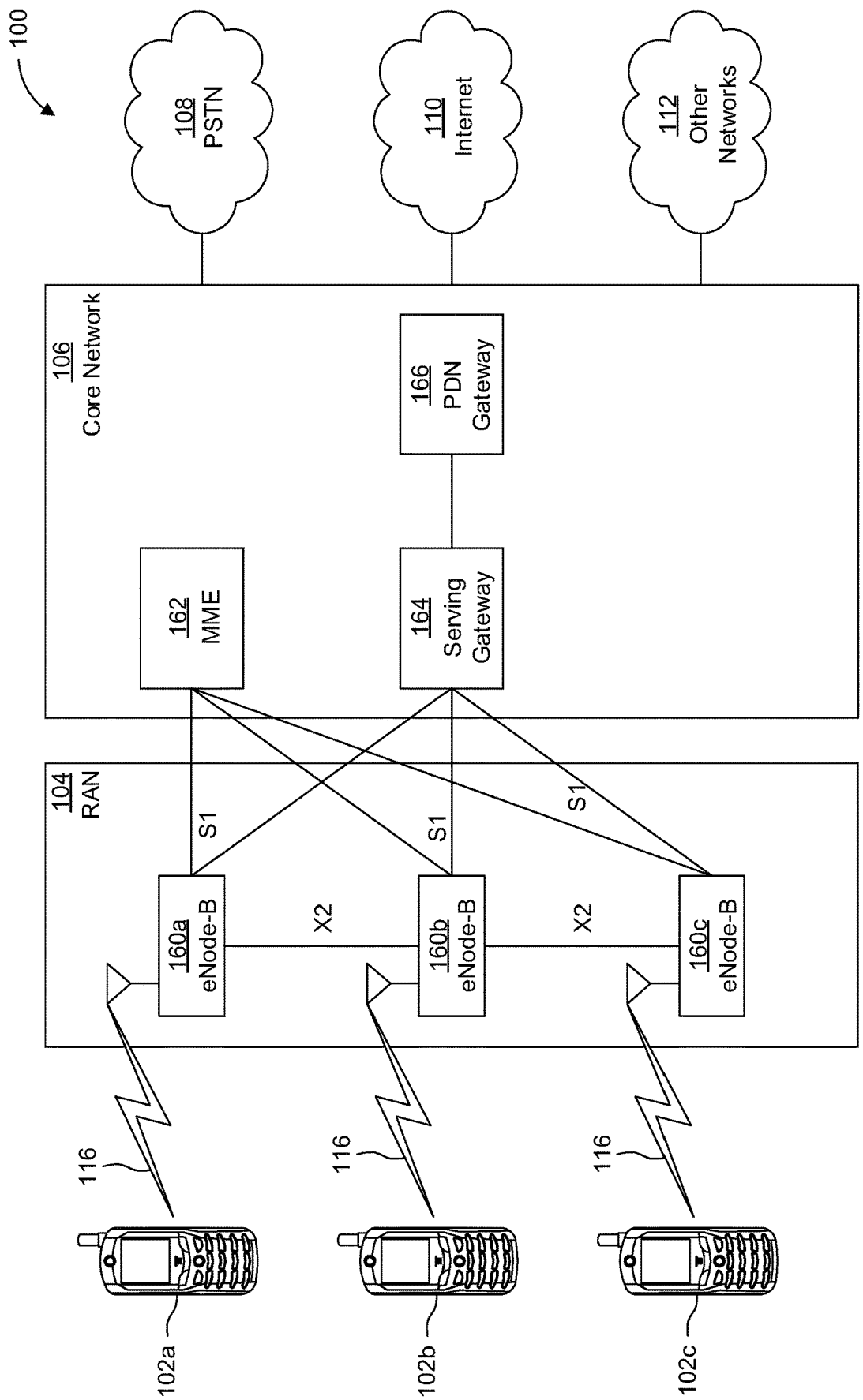
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
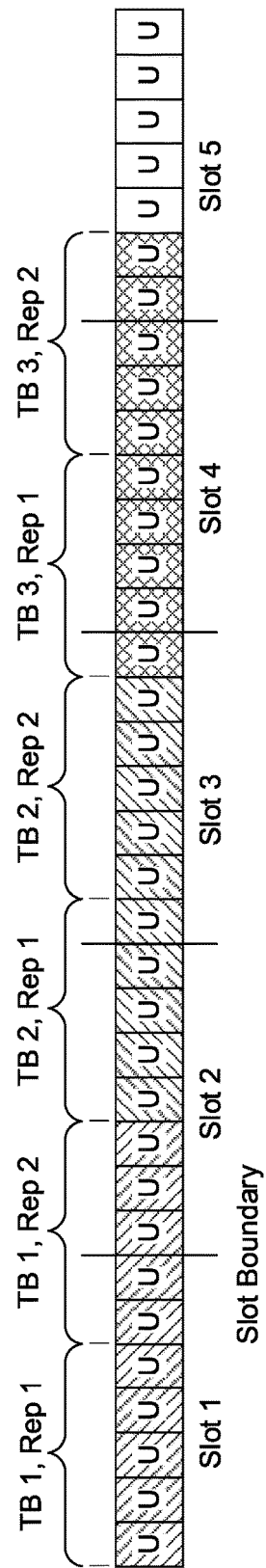
FIG. 10 shows an example mapping of repetitions using multi-TTI scheduling.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 10, the eNode-Bs 160*a*, 160*b*, 160*c* may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
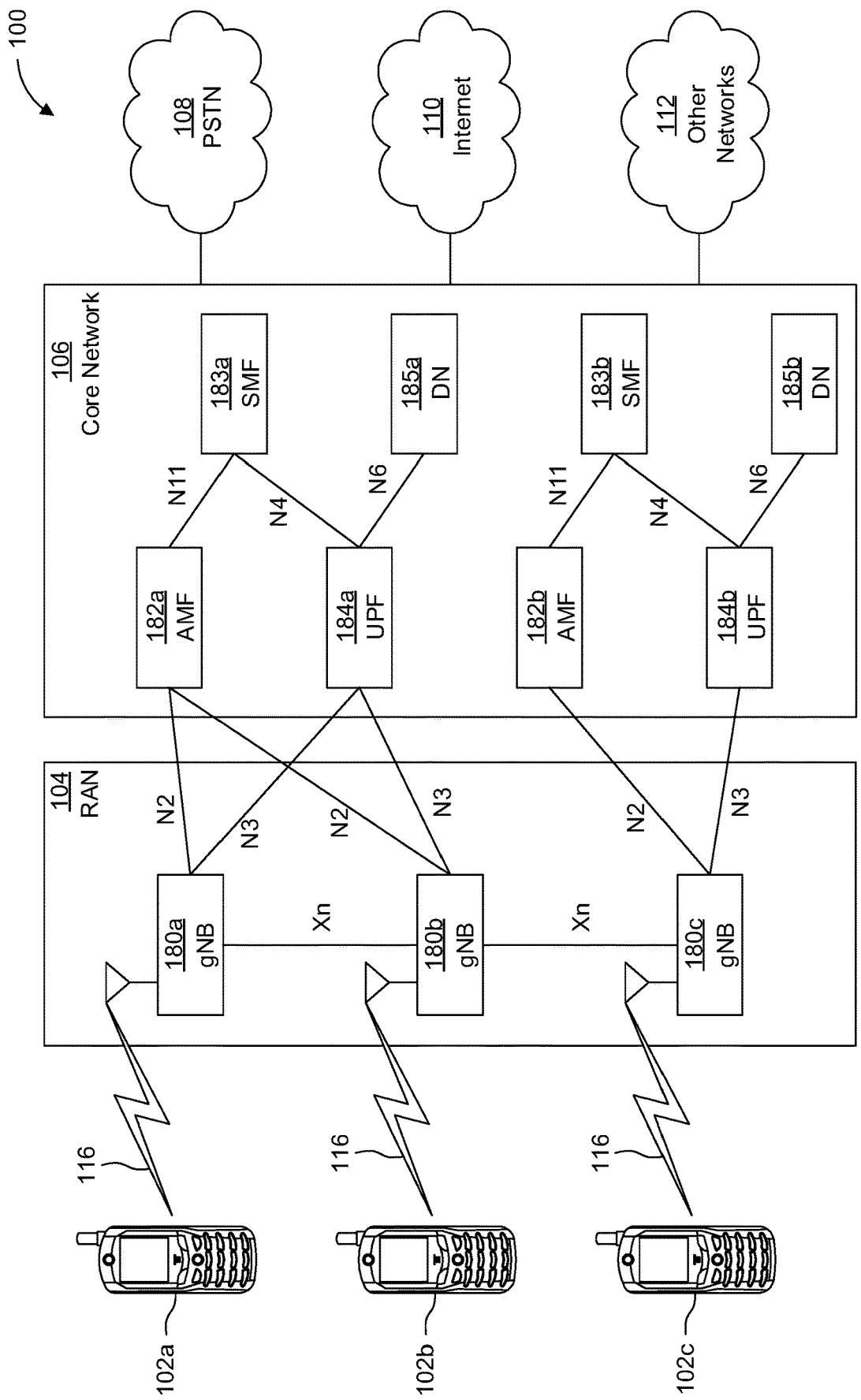
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WTRU may determine a mapping of actual repetitions of a nominal repetition as a function of a channel access procedure (e.g. listen-before-talk (LBT)) timing and channel occupancy time (COT) or fixed frame period (FFP) configuration/timing.

A WTRU may determine the content and transmission parameters of a PUSCH repetition as a function of at least one of: timing of a repetition, timing of an associated LBT, duration of a PUSCH repetition, location of an adjacent PUSCH repetition, timing of COT, outcome of a preceding LBT, timing of FFP idle periods, identity of a COT initiator, previous dropping of a transport block (TB), or a cancellation indication.

A WTRU may trigger repetition of a PUSCH transmission until reception of a hybrid automatic repeat request (HARQ)-ACK, expiration of a timer, or until a new TB may be transmitted.

A WTRU may transmit multiple repetitions of a TB in a set of non-adjacent slots to enable multi-TTI scheduling with repetitions.

Repetitions may be used to improve the reliability of a transmission without requiring the overhead of HARQ-ACK feedback. For ultra-reliable low-latency communication (URLLC), two types of repetition are defined: Repetition Type A and Repetition Type B.

Figure 2:
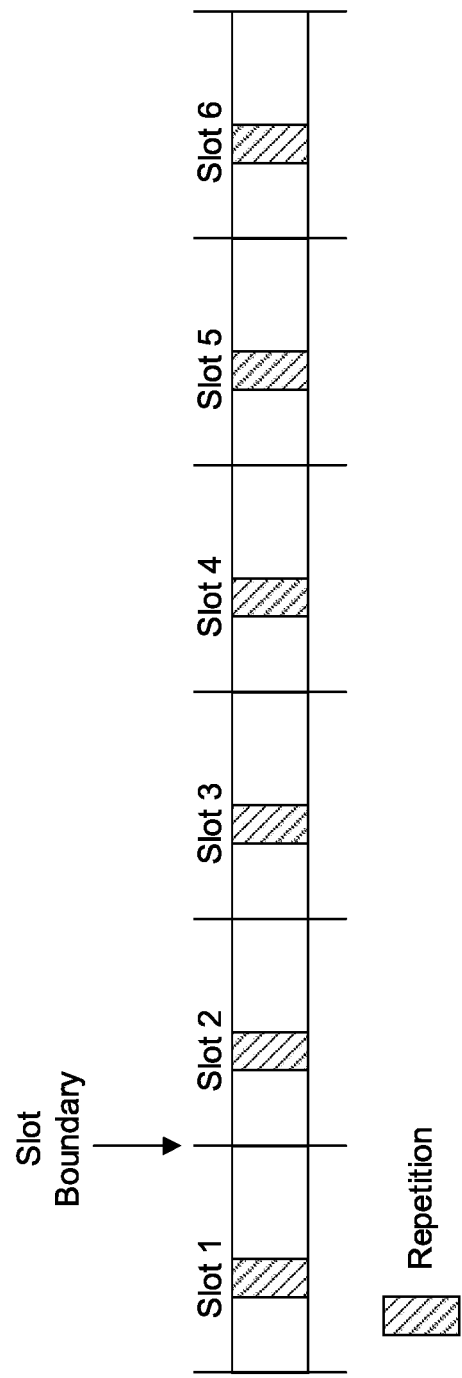
FIG. 2 shows an example of repetition Type A.

FIG. 2 shows an example of a repetition Type A. In FIG. 2, there are a plurality of slots separated by a slot boundary. A transmission repetition (e.g. PUSCH transport block (TB)) may be transmitted once in each slot. Each slot may contain only one repetition and the time domain for the repetitions is the same in those slots. A start and length indicator value (SLIV) is the same for all the slots.

Figure 3:
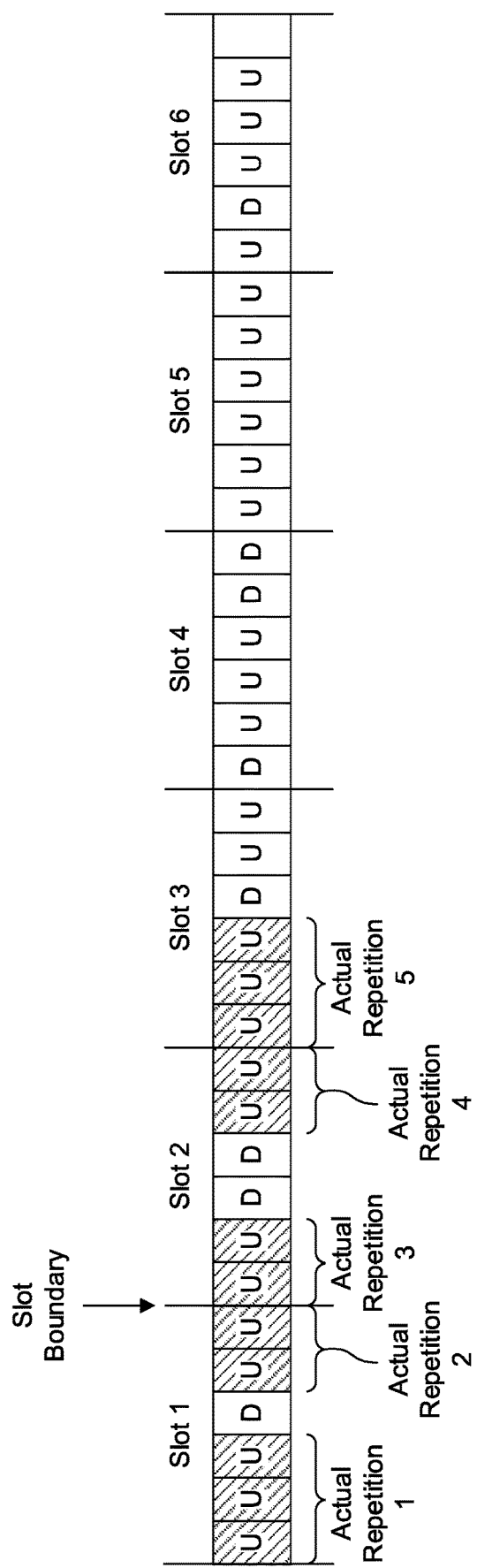
FIG. 3 shows an example of repetition Type B.

Repetition Type A may be a simple way of achieving repetitions. However, for shorter allocations (i.e. sub-slot allocations) such repetitions may not achieve optimal latency. It may be beneficial to enable sub-slot repetitions. FIG. 3 shows an example of a repetition Type B. In FIG. 3, there are a six symbols (which may be for uplink or downlink as indicated by an "U" or a "D" respectively) in each slot and each slot is separated by a slot boundary. A PUSCH transmission may be repeated within a slot.

A nominal repetition may be defined with a specific time domain resource assignment (TDRA)/transport block size (TBS) combination. A WTRU may receive information regarding nominal repetitions. The WTRU may receive information indicating a number of nominal repetitions and a number of symbols over which a PUSCH transmission may be repeated in a nominal repetition. A nominal repetition may be interrupted by, for example, a DL symbol or a slot boundary. A nominal repetition may be split into actual repetitions such that each actual repetition is not interrupted by a DL symbol or a slot boundary. Therefore, in a repetition scheme with K nominal repetitions, there may be more than K actual repetitions. For example, in FIG. 3, K=4 and a nominal repetition is 4 symbols. For this case, there are 5 actual repetitions.

Figure 4:
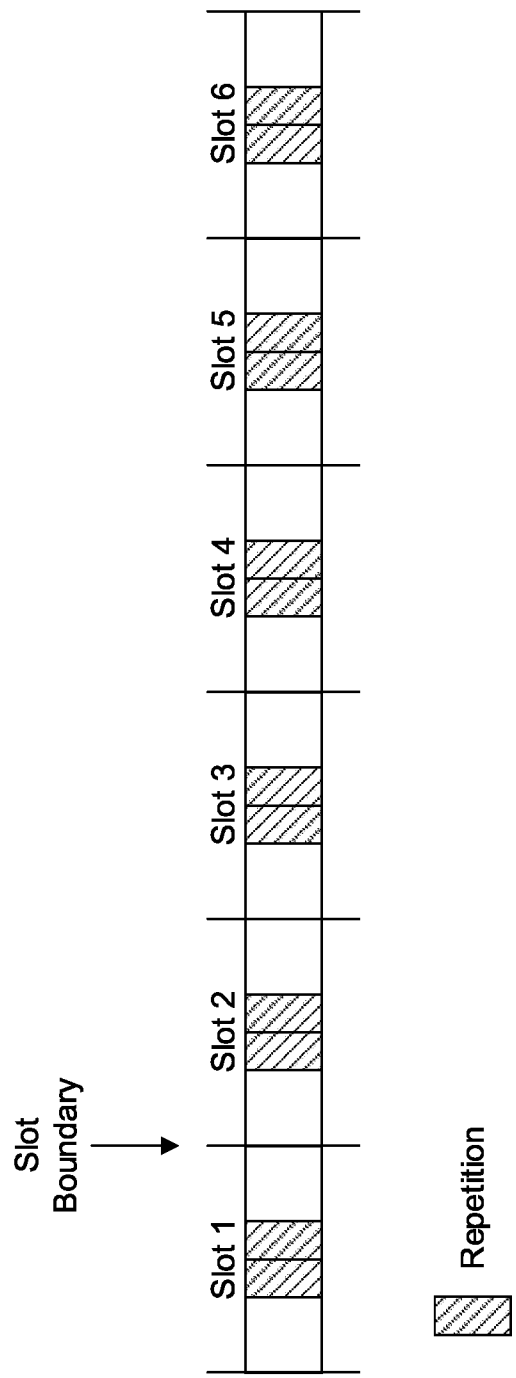
FIG. 4 shows an example of a modified repetition Type A.

Repetition Type A may be modified to enable multiple repetitions within a slot. FIG. 4 shows a modification of repetition type A where there are two repetitions within a slot. This may, for example, reduce the required number of LBTs required for a set of repetitions. However, each slot has the same number of repetitions and their positions are fixed within a slot.

Figure 5:
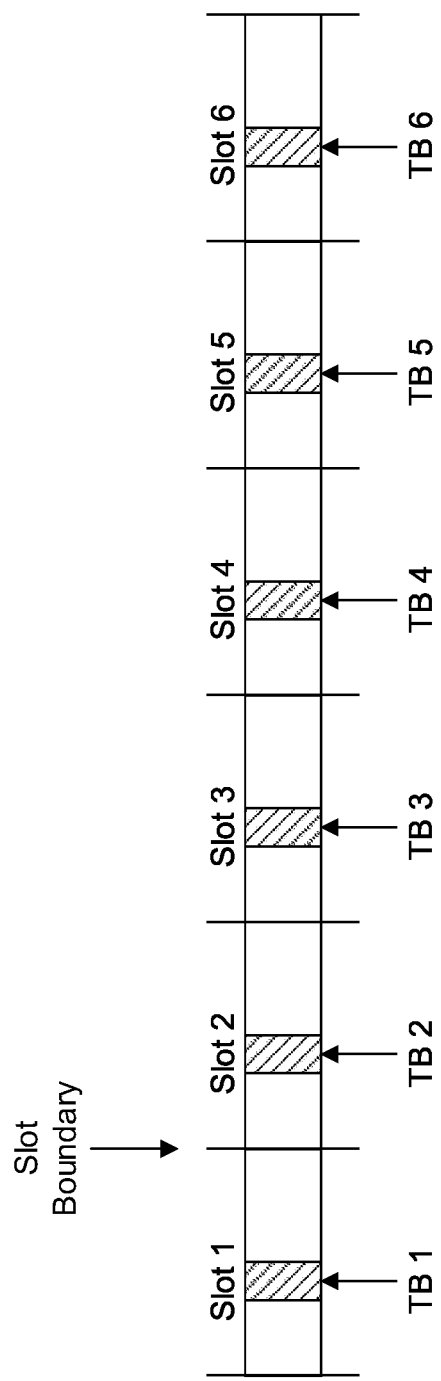
FIG. 5 shows an example of multi-TTI scheduling.

Multi-TTI scheduling may reduce the required signaling for multiple uplink grants. In multi-TTI scheduling, a new TB is transmitted in a set of slots. FIG. 5 shows an example of multi-TTI scheduling where a new (i.e. different) TB (e.g. TB 1 . . . TB 6) is transmitted in slots 1-6 respectively.

Repetitions (e.g. PUSCH repetitions) may be beneficial to improve robustness in unlicensed spectrum. Sub-slot repetitions for unlicensed spectrum may have limitations such that each slot may have a similar resource mapping. However, this scheme does not handle dynamic TDD slot formats well and it is not flexible to different PUSCH allocation sizes. Repetition Type B may have benefits, however it was not specified with unlicensed spectrum in mind. Therefore, methods are needed to enable repetition Type B in unlicensed spectrum to handle effects of LBT, COT, and FFP time.

Multi-TTI scheduling may be beneficial since it reduces the need for signaling. However, method are needed to enable multi-TTI scheduling with repetition, which may enable reduced signaling overhead in combination with robust and low latency transmission.

A WTRU may be configured to perform a set of repetitions (e.g. repetitions for a TB). The WTRU may use a channel access procedure (e.g. LBT) prior to at least one repetition. Channel access procedure or LBT may be used interchangeably herein.

A WTRU may determine when to perform LBT based on a repetition number. In an example, a WTRU may perform LBT prior to a specific repetition (e.g. a first repetition). In an example, a WTRU may perform LBT prior to all repetitions. In an example, a WTRU may perform LBT prior to every n-th repetition, where n may be configurable.

A WTRU may determine when to perform LBT based on a gap preceding a repetition. For example, if two successive repetitions are transmitted in adjacent symbols, the WTRU may not perform LBT prior to a second repetition. If two repetitions have a gap between them, the WTRU may perform LBT prior to the second repetition.

A WTRU may determine when to perform LBT based on a size of a gap between repetitions. For example, a WTRU may perform LBT prior to a second repetition if the gap between two successive repetitions is greater than a value x. The value x may be configurable.

A WTRU may determine when to perform LBT based on a cause or purpose of a gap between successive repetitions. For example, a WTRU may perform LBT prior to a second repetition as a function of the cause of the gap between the first and second successive repetitions. Causes of a gap may include, for example, at least one of: a DL symbol, a flexible symbol dynamically or semi-statically switched to DL, an orphan UL symbol, an idle period of a Fixed Frame Period (FFP), a cancelled transmission (e.g. due to indication via UL CI), a change of COT parameters, or dropped transmission due to failed LBT.

A WTRU may determine when to perform LBT based on a frequency hopping. For example, if frequency hopping is used between successive repetitions, a WTRU may perform LBT prior to a first repetition after a frequency hop.

A WTRU may determine when to perform LBT based on a beam change. For example, if a transmission beam is changed between successive repetitions, a WTRU may perform LBT prior to a first repetition occurring after a change of beams.

A WTRU may determine when to perform LBT based on COT timing. For example, if successive repetitions are to be transmitted in different COTs, the WTRU may perform LBT prior to a second repetition and may initiate a new COT. In an example, if the resources of a repetition overlap the end of a COT, WTRU may perform LBT prior to the transmission of the repetition, and may initiate a new COT.

A WTRU may determine when to perform LBT depending on who initiated the COT. For example, if the repetitions are transmitted in a WTRU-initiated COT, the WTRU may determine a first set of LBT occasions. If the repetitions are transmitted in a gNB-initiated COT, the WTRU may determine a second set of LBT occasions.

A WTRU may determine when to perform LBT based on a FFP timing. For example, if successive repetitions are to be transmitted in different FFPs, the WTRU may perform LBT prior to a second repetition.

A WTRU may determine when to perform LBT based on a previous LBT outcome. For example, a WTRU may perform LBT prior to a repetition if LBT failed prior to a preceding repetition. In an example, a WTRU may perform LBT prior to a repetition based on a quantitative performance of LBT for a preceding repetition. For example, a WTRU may have a first energy detection threshold to determine if it may transmit. The WTRU may also maintain the energy detection measurement and based on an absolute value (or compared to a second energy detection threshold) it may determine if LBT is required prior to a subsequent repetition transmission.

A WTRU may receive an indication that a resource (e.g. time or frequency unit or beam) may not be used for the transmission of a repetition. Such a resource may be considered a dynamically indicated invalid resource. The indication may inform the WTRU of a set of invalid resources as well as a type of channel access required to resume transmission after an occurrence of such an invalid resource. For example, a WTRU may receive an indication that a first resource may not be used for transmission of a repetition. Not transmitting on such a resource may lead to a gap (e.g. a new gap or an extension of an already present gap). The WTRU may determine a type of channel access (e.g. whether or not to use LBT, a type of LBT, parameters associated to the LBT) from the indication. In an embodiment, a WTRU may be configured with (e.g. semi-statically configured) or receive information regarding, a behavior to use to access a channel after such a dynamic invalid resource is configured.

The WTRU may receive an indication of an invalid resource or associated channel access in a DCI (e.g. a DCI scheduling a set of repetitions). The indication may explicitly indicate a set of resources on which a repetition transmission is invalid. In an embodiment, the indication may be a bitfield that maps to a configurable set of patterns of invalid resources or channel access types.

A WTRU may be configured with, or receive information of, a set of resources (e.g. time instances or frequency regions or beams) for when to perform LBT. When a WTRU is transmitting a set of repetitions it may determine that any one resource within a set of configured resources for when to perform LBT should be considered as an invalid symbol for transmission of a repetition. The WTRU may use one of the resources, within the set of configured resources, to perform LBT in order to acquire an unlicensed channel for transmission of one or more repetitions. For example, the WTRU may select a resource from the set of configured resources to perform LBT if such a resource occurs prior to (e.g. in a symbol immediately preceding) an actual or nominal repetition. The WTRU may perform LBT on one resource from the set of resources if, for example, there is no ongoing COT.

A WTRU may be configured with a set of nominal repetitions. The WTRU may determine a set of symbols over which each nominal repetition may occur.

The WTRU may determine if a set of symbols of a nominal repetition are valid as a function of whether LBT is required prior to a repetition. For example, if LBT is required prior to a transmission of a repetition, the first n symbols of the repetition may be reserved for LBT. In an example, if LBT is required prior to a transmission of a repetition, the last n symbols of a previous repetition may be reserved for LBT.

The WTRU may determine if a set of symbols of a nominal repetition are valid as a function of COT boundary timing. For example, if a COT ends on one of the symbols of a repetition, the WTRU may not transmit on a set of n subsequent symbols in the repetition. In another example, if a COT ends in a symbol preceding a repetition, based on the time of the COT ending, the WTRU may determine a set of m symbols at the beginning of a subsequent repetition that may not be used for transmission of the repetition.

The WTRU may determine if a set of symbols of a nominal repetition are valid as a function of FFP idle period timing. For example, if an FFP idle period occurs during a repetition, the symbols overlapping the idle period may not be used for a transmission of the repetition.

The WTRU may determine if a set of symbols of a nominal repetition are valid as a function of a prior LBT outcome. For example, based on an outcome of an LBT for a previous repetition, the WTRU may determine the set of symbols that may be used for transmission of a subsequent repetition.

When a nominal repetition has one or more invalid symbols that occur during the nominal repetition, the WTRU may split or segment the repetition into a plurality of actual repetitions. Each actual repetition may be an entire transmission of a TB (e.g. using rate matching) or may be a segment of a TB. All segments of a TB may be transmitted in the set of actual repetitions that comprise a nominal repetition.

Figure 6:
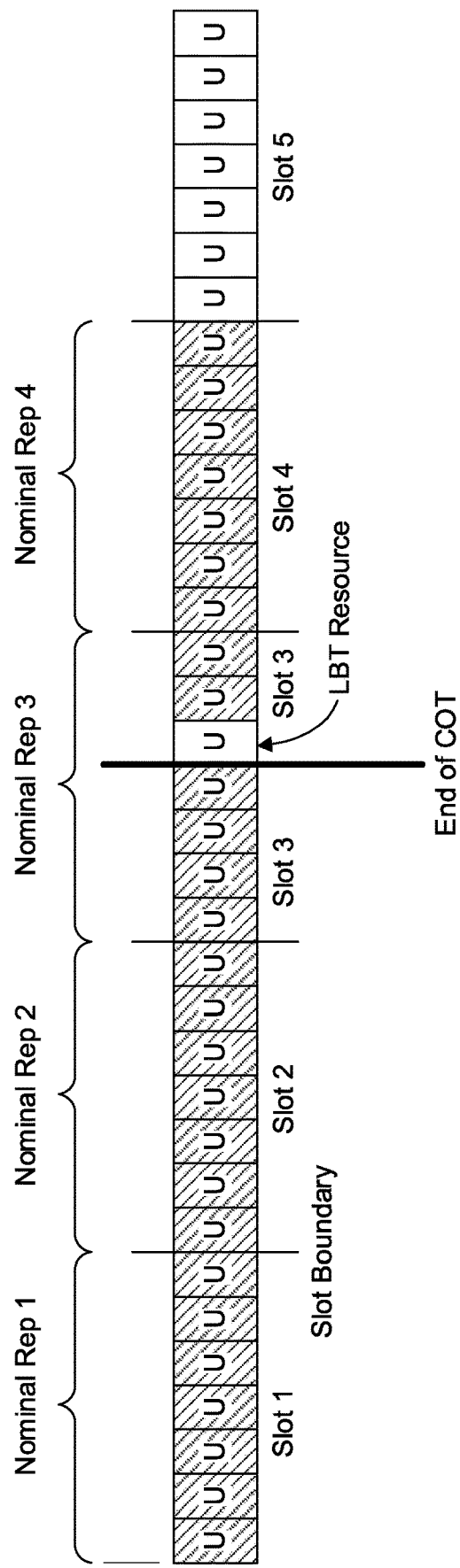
FIG. 6 shows an example of COT ending in the middle of a repetition.

FIG. 6 shows an example of a COT ending during a repetition. After the COT ends, the WTRU may use n symbols (where n=1 in the FIG. 6) for LBT to re-initiate a COT to continue transmitting a repetition. For the repetition where the COT ends (i.e. nominal repetition 3 in FIG. 6), the WTRU may use two actual repetitions for the nominal repetition. In embodiment, the WTRU may segment the repetition into two parts and transmit a first part in a first COT and a second part in a second COT.

The WTRU may split a nominal repetition into a plurality of actual repetitions as a function of COT timing or FFP idle period timing. The WTRU may segment a nominal repetition into a plurality of segments as a function of COT timing or idle period timing. For example, if a COT ends during a nominal repetition or an FFP idle period occurs during a repetition, the WTRU may split a nominal repetition and transmit two actual repetitions (e.g. each a copy of the TB) in the two sets of adjacent uninterrupted resources. The two sets of adjacent resources may be separated by the COT boundary timing or FFP idle period timing and may be separated by the resources used to perform LBT prior to the second repetition.

Figure 7:
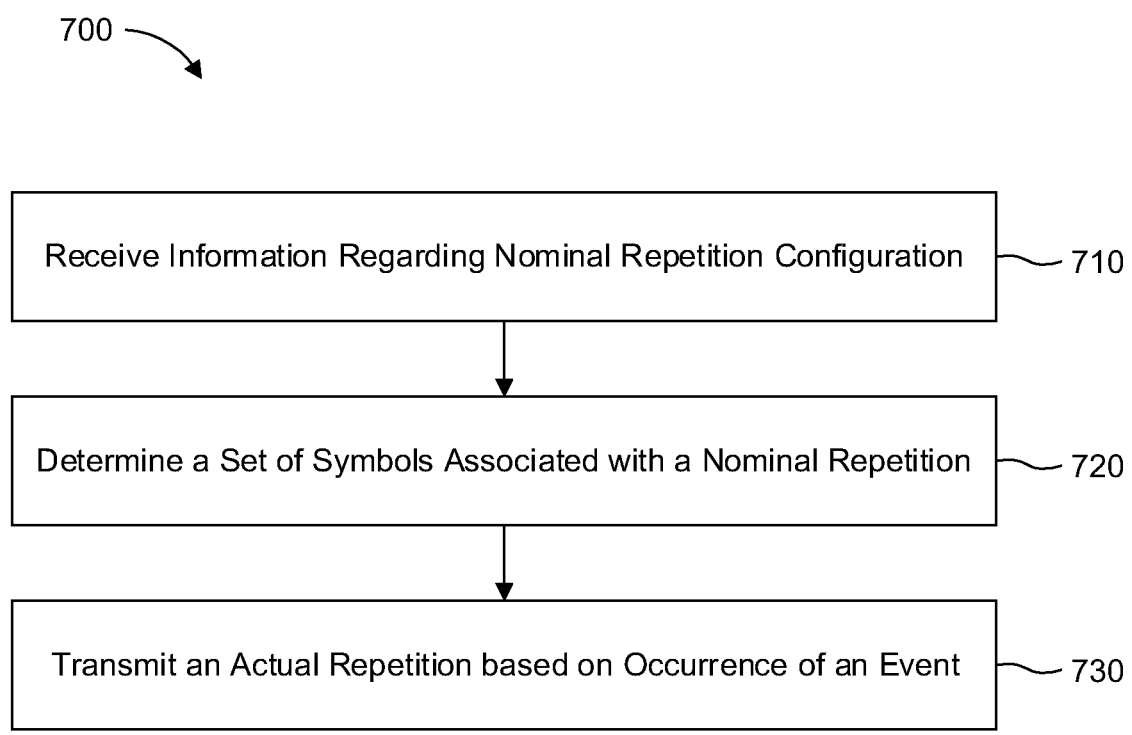
FIG. 7 shows an example of mapping a nominal repetition to actual repetitions.

FIG. 7 shows an example method (700) of mapping nominal repetitions to actual repetitions. A WTRU may receive information regarding a configuration of nominal repetitions (710). The information may indicate a number of nominal repetitions. The information may indicate a number of symbols to use for each nominal repetition. The WTRU may determine a set of symbols associated with a nominal repetition (e.g. a first nominal repetition) (720). The WTRU may determine a set of symbols associated with a nominal repetition as a function of at least one of: a starting symbol of one of the nominal repetitions (e.g. a first nominal repetition), a total number of repetitions, a number of symbols per repetition, a repetition number (e.g. whether the nominal repetition is the first or second or third, etc.), a SLIV received in an UL grant (e.g. in a DCI or RRC configuration), an SCS of the repetition(s), whether frequency hopping is used, a COT configuration, or a COT initiator (e.g. WTRU-initiated COT or gNB-initiated COT). The WTRU may transmit a number of actual repetitions (730). The number of actual repetitions may be greater than the number of nominal repetitions. An actual repetition may be transmitted in one or more symbols (e.g. consecutive symbols) that are associated with a nominal repetition. The transmission of an actual repetition may be based on an occurrence of an event during the set of symbols associated with a nominal repetition. The event may be, for example, a COT end, a channel access resource, a channel access procedure outcome, an FFP idle period start time, or FFP idle period end time. The set of symbols associated with a nominal repetition may comprise one or more subsets of consecutive uplink symbols. A subset of consecutive uplink symbols may comprise at least two symbols. One subset of consecutive uplink symbols may not overlap with another subset of the consecutive uplink symbols. The WTRU may transmit an actual repetition (e.g. a first actual repetition) in uplink symbols of the subsets of consecutive uplink symbols prior to the occurrence of the event. The WTRU may perform a channel access procedure (e.g. LBT). If the channel access procedure is successful, the WTRU may transmit another actual repetition (e.g. a second actual repetition) after transmission of the first actual repetition in uplink symbols of the subsets of consecutive uplink symbols after the occurrence of the event. If the channel access procedure fails. The WTRU may perform a second channel access procedure in a next symbol. If the second channel access procedure is successful, the WTRU may transmit another actual repetition after transmission of the first actual repetition in uplink symbols of the subsets of consecutive uplink symbols after the occurrence of the event. If the second channel access procedure fails, the WTRU may continue to perform a channel access procedure until a success and then may transmit an actual repetition.

A WTRU may perform LBT prior to a transmission of at least one repetition. In an embodiment, the WTRU may determine that a channel is busy and may not transmit at least one subsequent transmission (e.g. repetition). Each nominal or actual repetition may be associated with a set of possible start times. If the WTRU need not perform LBT prior to a first start time of a repetition, the WTRU may transmit the repetition using the first start time. If the WTRU needs to perform LBT prior to transmitting the repetition, the WTRU may perform a first LBT procedure prior to the first start time. If it is determined, based on the first LBT procedure, that the channel is idle and transmission is possible, the WTRU may transmit the repetition starting with the first start time. If it is determined, based on the first LBT procedure, that the channel is busy, the WTRU may perform a second LBT procedure prior to the second start time. If it is determined, based on the second LBT procedure, that the channel is idle and transmission is possible, the WTRU may transmit the repetition starting with the second start time. If it is determined, based on the second LBT procedure, that the channel is busy, the WTRU may perform a third LBT procedure prior to the third start time. The WTRU may continue to perform an additional LBT if it is determined, based on a current LBT, that the channel is busy.

A WTRU may indicate which LBT procedure was successful for the transmission of the repetition. The indication may be provided to a network (e.g. a gNB). For example, the indication may be provided in a CG-UCI of the repetition or of a subsequent repetition.

A WTRU may use frequency hopping between repetitions. A frequency hopping may ensure that the WTRU has repetitions scheduled for different LBT bandwidths (BWs) or channels, which may increase channel access probability. A WTRU may be configured with, or receive configuration information of, an LBT BW hopping pattern. Such a configuration may be semi-static or may be dynamic. For example, the WTRU may receive the configuration information in a DCI that schedules the set of repetitions.

A WTRU may determine a set of invalid symbols associated to a frequency hop. For example, the invalid symbols may affect a mapping of the first repetition transmitted after (e.g. immediately after) a frequency hop. Such a set of invalid symbols may be used by the WTRU to perform LBT in a new LBT BW.

A WTRU may perform LBT after a frequency hop. The WTRU may perform LBT after a frequency hop if the hop has moved the transmission to a frequency region that is in a new LBT BW (i.e. compared to the frequency region of a preceding hop).

A WTRU may perform LBT prior to a set of repetitions. Such an LBT procedure may be applicable to the transmission of a subsequent set of repetitions.

A WTRU that is performing LBT prior to a set of repetitions may perform LBT on at least one of: the LBT BW covering the resources of the next repetition; or the LBT BW covering the resources of all the repetitions in a set of repetitions.

In an embodiment, a WTRU may perform LBT over the LBT BWs of a set of repetitions prior to a transmission of the set of repetitions. The WTRU may not need to perform LBT at each frequency hop. In an embodiment, the WTRU may perform a first LBT of a first LBT type (e.g. LBT Type 4 or full LBT) over the LBT BWs of a set of repetitions prior to the transmission of the set of repetitions, and a second LBT of a second LBT type (e.g. LBT type 2 or short LBT) at each frequency hop or only over the LBT BW of the transmissions occurring after the frequency hop.

A WTRU may be configured with multiple LBT types. Each LBT type may have different channel assessment parameters (e.g. energy detection threshold, contention window size, clear channel assessment slot duration, etc.).

The WTRU may determine an LBT type to use prior to transmission of a nominal or actual repetition by COT timing. For example, the WTRU may perform a first type of LBT (e.g. LBT type 4) prior to a repetition if the COT has ended prior to the timing of the repetition or will end during the timing of the repetition. In an embodiment, the WTRU may determine the type or configuration of LBT (where a type may include not doing LBT) based on a time the current COT was initiated. For example, the WTRU may determine the type or configuration of LBT based on whether a current COT was initiated prior to a set of repetitions or during the transmission of a set of repetitions.

The WTRU may determine an LBT type to use prior to transmission of a nominal or actual repetition by a COT initiator. For example, the WTRU may determine the type of LBT as a function of a node that originally initiated a COT during which a repetition is transmitted.

The WTRU may determine an LBT type to use prior to transmission of a nominal or actual repetition by a COT status. For example, the WTRU may perform a first type or configuration of LBT (where a type may include not doing LBT) if there is an ongoing COT and a second type or configuration of LBT if there is no ongoing COT and a COT needs to be initiated.

The WTRU may determine an LBT type to use prior to transmission of a nominal or actual repetition by a gap size. For example, the WTRU may determine the type of LBT to use prior to transmitting a repetition as a function of the gap size between that repetition and a preceding repetition.

The WTRU may determine an LBT type to use prior to transmission of a nominal or actual repetition by a cause of a gap. For example, the WTRU may determine the type of LBT to use prior to transmitting a repetition as a function of the cause of a gap between that repetition and a preceding repetition. Causes of a gap may include: a DL symbol, a flexible symbol dynamically or semi-statically switched to DL, an orphan UL symbol, an idle period of a Fixed Frame Period (FFP), a cancelled transmission (e.g. due to indication via UL CI), a change of COT parameters, or dropped transmission due to failed LBT.

The WTRU may determine an LBT type to use prior to transmission of a nominal or actual repetition by whether the transmission is for a different TB than a preceding (e.g. immediately preceding) repetition transmission. For example, the WTRU may transmit multiple TBs. Each TB may have multiple repetitions. The WTRU may determine the LBT type if two successive repetitions are for a same or different TB.

A WTRU may determine the content to include in a repetition (i.e a nominal or actual repetition). In a repetition transmission, a WTRU may include, for example, at least one of the following elements: a CG-UCI, a demodulation reference signal (DM-RS), a UCI (e.g. scheduling request (SR), a channel state information (CSI), a HARQ-ACK, or a TB.

The WTRU may determine what content to include in a repetition transmission based on a repetition number. For example, a WTRU may include a CG-UCI in (e.g. only in) a first repetition. In an example, the WTRU may include a CG-UCI or UCI in an n-th repetition or in every m-th repetition.

The WTRU may determine what content to include in a repetition transmission based on a repetition size. For example, the WTRU may include CG-UCI if the repetition duration is greater than a value x. The value of x may be fixed or may depend on a nominal repetition size. For example, if a nominal repetition is of size n and due to invalid resources, an actual repetition is of size m, the UE may include CG-UCI if m>n−k, where k may be configurable or fixed.

The WTRU may determine what content to include in a repetition transmission based on whether a repetition has been split or segmented. For example, the WTRU may include a CG-UCI or DM-RS or UCI once per nominal repetition. If a nominal repetition is split or segmented into a plurality of actual repetitions, the WTRU may transmit the CG-UCI or DM-RS or UCI in a single actual repetition. The WTRU may determine the actual repetition to include the CG-UCI or DM-RS or UCI as being a y-th (e.g. first or last) repetition. The WTRU may determine the actual repetition to include the CG-UCI or DM-RS or UCI as an actual repetition with duration greater than a value x.

The WTRU may determine what content to include in a repetition transmission based on whether a repetition was preceded (e.g. immediately preceded) by LBT. For example, the WTRU may include a CG-UCI if it performed an LBT procedure prior to the repetition (e.g. after the immediately preceding repetition).

The WTRU may determine what content to include in a repetition transmission based on COT timing. For example, the WTRU may include a CG-UCI in a repetition if a new COT has been initiated prior to the transmission of that repetition or in the time between that repetition and a preceding repetition (e.g. immediately preceding).

The WTRU may determine what content to include in a repetition transmission based on a repetition number within a slot. For example, the WTRU may include a CG-UCI or DM-RS or UCI in a single repetition within a slot. The WTRU may include a CG-UCI or DM-RS or UCI in the first repetition of a slot.

The WTRU may determine what content to include in a repetition transmission based on a HARQ process ID. For example, the WTRU may include a CG-UCI if the HARQ process ID of the TB has changed since a previous repetition transmission.

The WTRU may determine what content to include in a repetition transmission based on a priority of a transmission. For example, the WTRU may determine whether to include a CG-UCI or UCI as a function of a priority of the UCI or the TB.

The WTRU may determine what content to include in a repetition transmission based on a previously dropped transmission. For example, if a CG-UCI was dropped from a preceding repetition, it may be included in a subsequent repetition. In an example, if a previous transmission was dropped (e.g. due to failed LBT of reception of UL CI), the WTRU may include a CG-UCI in a subsequent repetition transmission.

The WTRU may determine what content to include in a repetition transmission based on whether rate matching is used on the TB.

The WTRU may determine what content to include in a repetition transmission based on whether a frequency or a beam has changed. For example, the WTRU may include a CG-UCI if a repetition is transmitted after frequency hopping or after a change of a transmission beam.

A WTRU may determine what elements to include in a repetition transmission as a function of more than one transmission criterion described herein. As an example, if a priority of a TB is high (e.g. greater than a threshold or configured value), the WTRU may determine that a CG-UCI may be included in every repetition. In an example, if the priority of UCI is high (e.g. greater than a threshold or configured value), the WTRU may include UCI in a first set of repetitions, and if the priority of UCI is low (e.g. less than a threshold or configured value), the WTRU may include UCI in a second set of repetitions.

The WTRU may drop an element from a repetition to include another element. For example, the WTRU may drop CG-UCI and transmit only UCI with the TB if the UCI is a high priority (e.g. greater than a threshold or configured value). When an element is dropped to enable the transmission of another (e.g. of higher priority), the WTRU may include the dropped element in a subsequent repetition.

A CG-UCI may be transmitted in a plurality of repetitions of a set of repetitions. The content of the CG-UCI may remain the same for each repetition. In an example, if the CG-UCI is transmitted in more than one repetition, the CG-UCI content may change per CG-UCI transmission. For example, a first CG-UCI in a set of repetitions may include required information (e.g. all the required information) and any subsequent CG-UCI within the set of repetitions may include only changes or updates to the CG-UCI. In an example, the first CG-UCI in a set of repetitions may include required information (e.g. all the required information) and subsequent CG-UCI may include only information relevant to that repetition. For example, if the HARQ process ID may change for each repetition, the CG-UCI may include the HARQ process ID relevant to an associated repetition whereas any other content that is fixed for all repetitions may be transmitted by the WTRU only once per set of repetitions.

The content of a CG-UCI may be determined by rules similar to those described herein to determine whether to include the CG-UCI. For example, the content of the CG-UCI may depend on a size of an actual repetition and may be in conjunction with a size of a nominal repetition.

The content of a CG-UCI may depend on whether it is multiplexed with other UCI. The content of the CG-UCI multiplexed with other UCI may depend on a priority of the CG-UCI or the TB or the priority of the other UCI.

The content of a CG-UCI may include at least one of: HARQ process ID, repetition number, priority (e.g. priority of a transmission or priority of an LBT used prior to the transmission), redundancy version (RV), modulation and coding scheme (MCS), beam ID, nominal repetition duration, and DMRS mapping type.

An orphan symbol may occur when a nominal repetition is split or segmented into a plurality of possible actual repetitions and one such possible actual repetition is a single symbol. The split or segmentation may be caused by at least one of: a DL symbol, slot boundary, COT timing, or FFP idle period timing.

A WTRU may use an orphan symbol to transmit one or more elements of a repetition. This may be beneficial to reduce the need for an LBT caused by an unused orphan symbol gap. In an example, a WTRU may transmit a CG-UCI or DM-RS in an orphan symbol. In such a case, the WTRU may not need to transmit a CG-UCI or DM-RS in one or more associated actual repetitions.

The WTRU may determine whether to transmit on an orphan symbol or what element to transmit in an orphan symbol based on a transmission criteria described herein.

An orphan symbol may be associated with an actual repetition based on whether both the orphan symbol and the actual repetition are in the same nominal repetition.

An orphan symbol may be associated with an actual repetition based on a timing of the orphan symbol. For example, the orphan symbol may be associated to a preceding actual repetition. In another example, an orphan symbol may be associated to a subsequent actual repetition.

An orphan symbol may be associated with an actual repetition based on a duration of an actual repetition. For example, an orphan symbol may be associated to an actual repetition if it is of a duration less than a value x or greater than a value y.

An orphan symbol may be associated with an actual repetition based on a slot timing. For example, an orphan symbol may be associated to an actual transmission if the orphan symbol and actual transmission are in the same slot.

An orphan symbol may be associated with an actual repetition based on COT status. For example, a WTRU may determine to transmit on an orphan symbol if there is an ongoing COT or if there is not an ongoing COT.

An orphan symbol may be associated with an actual repetition based on a COT indicator. For example, a WTRU may determine to transmit on an orphan symbol as a function of which node (e.g. WTRU or gNB) initiated the ongoing COT. For example, if the gNB or another WTRU initiated the COT, the WTRU may not transmit on an orphan symbol. If the WTRU initiated the COT, the WTRU may transmit on the orphan symbol.

The WTRU may determine whether to use an orphan symbol to transmit an element as a function of a gap that may be created if the orphan symbol is not used. For example, if not transmitting on an orphan symbol creates a gap between repetitions that is greater than a value x (e.g. a gap that would then require LBT prior to the next repetition transmission), the WTRU may transmit one or more elements on the orphan symbol. The WTRU may determine whether to use an orphan symbol for transmission based on if two orphan symbols are adjacent. For example, when two orphan symbols are adjacent, the WTRU may transmit on at least one of the orphan symbols.

Figure 8:
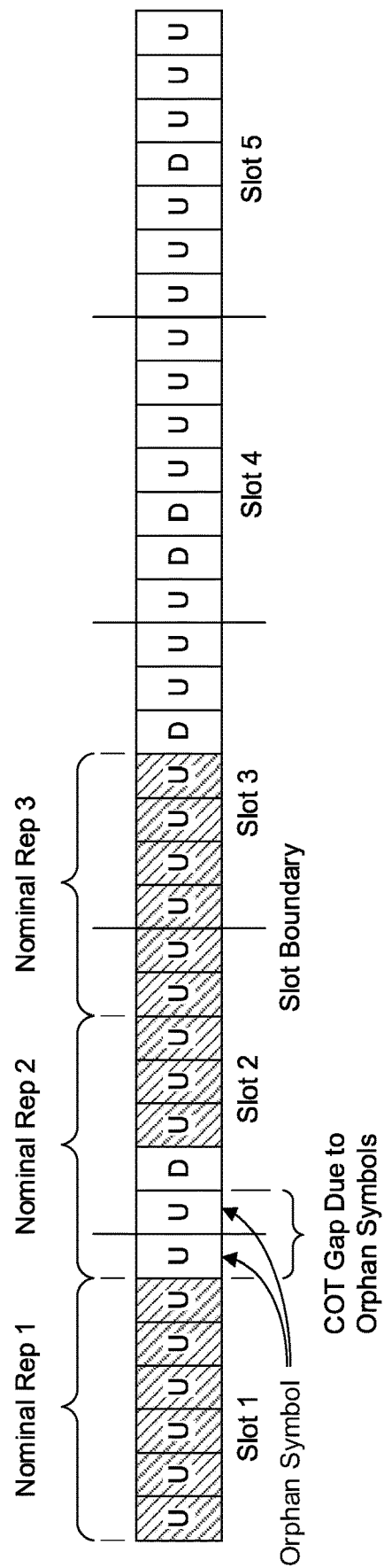
FIG. 8 shows an example of orphan symbols.

FIG. 8 shows an example of two adjacent orphan symbols, both occurring in nominal repetition 2. In this case, the WTRU may determine that a gap created by the one or more adjacent orphan symbols is greater than a threshold value. The threshold value may be configured or fixed or the WTRU may receive an indication of a threshold value. The indication may be received via, for example, a DCI, MAC or RRC configuration. The WTRU may transmit a repetition element (e.g. a CG-UCI, DM-RS, UCI, or TB) in at least one of the orphan symbols. This may be beneficial to maintain a COT and to reduce the need for LBT prior to transmitting the rest of nominal repetition 2.

A WTRU may transmit UCI in an orphan symbol. The WTRU may transmit UCI on a PUSCH in the orphan symbol. In an embodiment, the WTRU may transmit UCI on a physical uplink control channel (PUCCH) if it is configured with a PUCCH resource in the orphan symbol. In such a case, subsequent repetitions in the nominal repetition (e.g. associated repetitions) may include the UCI on a PUSCH or may not include the UCI at all.

A WTRU may transmit a DM-RS on an orphan symbol if it is configured for cross-repetition or cross-slot DM-RS.

A WTRU may transmit a number of symbols larger than a number of symbols in a nominal repetition to keep occupying the channel. The WTRU may transmit a number of actual repetitions larger than required (e.g. the configured number) to keep the COT. The WTRU may determine that another new TB is arriving within a certain time before the expiration of the current COT occupied by the WTRU. The WTRU may transmit additional repetitions and/or symbols of the current TB to keep occupying the channel until the next TB arrives in the WTRU buffer and/or may be transmitted. The WTRU may determine the TB arrival based on a configured traffic pattern. In an example, the WTRU may already have buffered bits for transmission on a new TB, but transmitting a nominal repetition for that new TB may require waiting for another UL slot or a different PUSCH occasion (e.g. after DL interruption) or the number of UL symbols and/or slots remaining before a DL interruption does not allow the WTRU to transmit the new TB. The WTRU may transmit additional symbols and/or repetitions of the current TB, even if it is beyond the configured number of required repetitions and/or symbols in the nominal repetition, to keep occupying the channel until: the DL interruption time, the next FFP IDLE period, the COT may be shared with the gNB, receiving an indication from the gNB to stop, or the WTRU may access an uplink slot that may be used to transmit the new data, possibly on the same HARQ process.

The WTRU may repeat the TB until an expiration of time (e.g. a CG timer) or upon a determination that x time has elapsed for a HARQ process, or until receiving a HARQ-ACK equals ACK on the downlink feedback information (DFI). In an example, the WTRU may keep occupying the channel with a transmission from a different HARQ process y until a determination that a CG-retransmission time has elapsed (e.g. a CG-retransmission timer expires) for pending HARQ process x. This may allow the WTRU to immediately retransmit the TB and/or repetition of HARQ process x after a determination that a CG-retransmission time has elapsed (e.g. upon expiration of the CG-retransmission timer).

The WTRU may repeat a transmission up to a configured number of repetitions (e.g. rep K) or until a next downlink slot or downlink symbol. The WTRU may receive an indication from a downlink control information (DCI) or radio resource control (RRC) indicating a configured grant within which the WTRU may transmit the repetition until a next downlink is encountered. This may be helpful to maintain a burst of repetition transmissions until the next downlink slot or until the idle period or until the COT may be released or shared with the gNB.

The WTRU may multiplex UCI on an uplink channel (e.g. CG-UCI on PUSCH) that it is transmitting additional symbols and/or additional repetitions (e.g. to keep the COT or until the end of the COT). The UCI may comprise the number of additional symbols or additional repetitions in a current COT or relative to the bundle size.

In an embodiment, a gNB may inform the WTRU a dynamic number of repetitions and/or symbols to be used to transmit an actual repetition during an UL transmission opportunity that follows a DL, possibly in a shared COT. For example, in a scenario where a TDD split in a slot or a frame is configured as DUUUU-DUUUU, even if the nominal repetition is three symbols (or slots), the WTRU may transmit an actual repetition of four symbols to ensure the COT is maintained to the next DL symbol or slot, the next FFP or idle period, or until the indicated amount of uplink symbols or slots have elapsed. The WTRU may transmit additional symbols of an actual repetition upon receiving an indication from the gNB, where the number of symbols may be larger than the nominal repetition. The WTRU may transmit additional repetition(s) upon receiving an indication from the gNB, where the number of repetitions may be larger than the configured number of repetitions. The indication from the gNB may indicate a number of symbols applicable for the remaining repetition(s), a number of symbols applicable for the remaining repetition(s) in the current/shared COT, a number of additional repetitions, or a number of additional repetitions in the current/shared COT.

The WTRU may transmit a number of UL symbols in an actual repetition less than the number of symbols in a nominal repetition. For example, the WTRU may transmit on a number of symbols or an orphan symbol to maintain the COT. The WTRU may be configured with a minimal number of symbols. The configuration may be by higher layers. If the number of symbols in an actual repetition is less than the minimal number of symbols, the WTRU may transmit the repetition but without counting it towards the configured target number of repetitions, or the WTRU may not transmit the repetition at all.

A WTRU may postpone, skip, or cancel a repetition upon encountering an UL LBT failure. The WTRU may increment a repetition count if the repetition was transmitted.

When the WTRU encounters an UL LBT failure for a repetition, receives a cancellation indication, or drops a repetition due to, for example, inter/intra-WTRU prioritization, the WTRU may continue the remaining repetitions when it encounters the next transmission opportunities or terminate the transmission of remaining repetitions. The WTRU may drop, skip, delay, or cancel the repetition. The WTRU may continue to transmit repetitions if: a repetition count is below a predetermined threshold, when the channel is acquired again, and/or if the number of UL symbols per previously transmitted repetition(s) were equal to the nominal repetition. The WTRU may be configured with the predetermined threshold by, for example, RRC, MAC-control element (MAC-CE), or a DCI.

The WTRU may receive a DCI MAC CE or RRC signaling indicating resuming the transmission of remaining repetitions and/or a configured grant within which the WTRU may continue the remaining repetitions. The WTRU may receive a DCI or RRC indicating the HARQ ID the WTRU may use to transmit remaining repetitions. The WTRU may receive an explicit indication from a gNB to interrupt or cancel remaining repetitions while the WTRU waits for a next uplink slot to complete the specified number of repetitions. The WTRU may cancel or suspend a repetition before a repetition count reaches a configured number of repetitions (e.g. rep K), possibly for a given HARQ process. For example, the WTRU may receive a dynamic notification in a DCI or MAC-CE, possibly in a different COT that the one used to transmit the initial set of repetitions, to terminate or suspend repetitions from the network in the downlink slots. The WTRU may cancel remaining repetitions if they were dropped due to network signaling (e.g. due to receiving a cancelation indication from the gNB), but may not cancel them if they were dropped due to LBT failure or intra-WTRU prioritization where the gNB may not be aware that those repetitions were dropped/not-transmitted.

The WTRU may use a different LBT configuration (e.g. channel access priority class (CAPC), LBT category, or change LBT parameters) to transmit a repetition that failed LBT (e.g. based on a number of failed LBTs or a number of LBT failures counted such as in the MAC layer).

The WTRU may change the number of UL symbols and/or slots used to transmit an actual repetition after acquiring another COT to transmit remaining repetition(s) The change may be based on, for example, an available number of UL slots and/or symbols in the new COT and the available UL resource allocation (e.g. the configuration of the CG in the new COT and/or the allocation of a dynamic grant provided in the new COT). The WTRU may include in a UCI multiplexed on a PUSCH (e.g. CG-UCI) indicating the HARQ process, the TB index, and/or the RV of the applicable repetition. The WTRU may skip incrementing the RV number upon failing LBT for a repetition within a sequence. The WTRU may indicate in the UCI that a subset of past repetitions were dropped due to LBT failure or intra-WTRU deprioritization (e.g. to aid the soft combining). For example, the WTRU may indicate, in a CG-UCI transmitted in a first subsequent repetition after a set of dropped repetitions, that a previous set of repetitions were dropped. The indication may include the identity or number of previous repetitions that were dropped. The indication may be included in multiple subsequent CG-UCIs (e.g. for robustness). A bitmap may be included in the CG-UCI flagging the set of repetitions that were dropped.

An UL LBT failure counter or indicator may be maintained per repetition or per set of repetitions or per LBT attempt. For example, an UL LBT failure may be incremented by one each time the LBT fails, or may be incremented by the number of repetitions (e.g. actual or nominal) that were dropped due to the LBT failing. If a repetition has multiple start times, an UL LBT failure counter may be incremented if none of the repetition start times were deemed valid due to all LBTs failing. If a nominal repetition is segmented into multiple actual repetitions, the UL LBT failure counter may be incremented for each failure to transmit an actual repetition or if all the actual repetitions fail.

A WTRU may be restricted to transmit repetitions (e.g. Type A or Type B) based on which device initiated a COT. For example, a WTRU may be restricted to transmit repetitions on only gNB initiated COT, WTRU initiated COT, or both. Whether a repetition is permitted on a COT initiated by a gNB, initiated by a WTRU, or both may be configured semi-statically by RRC or indicated via a DCI. The WTRU may be configured to allow only Type A, Type B, or Type A and B repetitions based on which device initiated a COT.

A WTRU may select which COT to transmit repetitions depending on a length of FFP or remaining FFP duration. For example, if a length of repetition transmission exceeds a remaining time of gNB FFP, and the WTRU is configured with an upcoming FFP with a duration long enough to accommodate a repetition duration, WTRU may transmit the repetition on WTRU-initiated COT. If the WTRU configured FFP start time occurs too far in the future, or if configured WTRU-initiated COT FFP duration is insufficient to transmit a full repetition, the WTRU may rate-match the repetition to accommodate the remaining gNB FFP duration.

A WTRU may be configured with dedicated WTRU-initiated COT FFP parameters, for example: FFP periodicity, start offset, and FFP duration, if WTRU-initiated COT is used for repetition transmission. This configuration may be configured semi-statically via dedicated signaling (e.g. via RRC signaling, via MAC CE, or via DCI). FFP parameters may be mapped to repetition type (e.g. Type A or B) and/or repetition parameters (e.g. repetition duration and number of repetitions).

A WTRU may initiate a WTRU-initiated COT if a repetition transmission is scheduled to start directly after successful clear channel assessment (CCA) (i.e. at a beginning of WTRU-initiated FFP). If the WTRU is configured with multiple FFP configurations, the WTRU may select an FFP configuration which has a FFP start aligned with a beginning of a scheduled repetition transmission. If a scheduled start of repetition does not align with the beginning of WTRU-initiated FFP start time, the WTRU may transmit (e.g. padding bits) to initiate a channel until a scheduled repetition.

If an IDLE period interrupts WTRU repetition transmission, the WTRU may cancel transmission of remaining repetitions. The WTRU may suspend transmission until completion of the IDLE period and resume repetition at a beginning of a new FFP. The WTRU may differentiate how an IDLE period affects repetition transmission handling depending on whether the IDLE period was initiated by a gNB or the WTRU. For example, if the IDLE period occurs at the end of a WTRU-initiated FFP, then the WTRU may cancel transmission of remaining repetitions. If the WTRU is sharing a gNB-initiated COT, the WTRU may suspend transmission until completion of the IDLE period and resume transmission of repetitions.

The WTRU may determine overlapping between a PUSCH repetition of a first priority (e.g. priority index 0) and a PUCCH or PUSCH transmission of a second priority (e.g. priority index 1). It may be beneficial to avoid a transmission gap that would require LBT before subsequent repetitions.

In an embodiment, a WTRU may cancel transmission of a PUSCH repetition of a first priority (e.g. priority index 0) for the time symbols in which overlap exists with a transmission of another priority (e.g. priority index 1). In the remaining time symbols, the WTRU may transmit the same modulated symbols and reference signal(s) as if no cancellation occurred in the overlapped symbols.

In an embodiment, a WTRU may consider that the time symbols in which overlap exists are "invalid symbols" for the purpose of determining a set of actual repetitions out of a nominal repetition according to procedures defined for PUSCH repetition type B. Non-overlapped symbols may be considered as "potentially valid" symbols and the WTRU may define actual repetitions as consecutive sets of potentially valid symbols. The WTRU may transmit an actual repetition of even a single symbol in this scenario even if it otherwise would not, based on rules applicable to PUSCH repetition type B.

In an embodiment, a WTRU may determine an actual repetition for a set of consecutive symbols for which overlap exists. The WTRU may multiplex an overlapping transmission of priority index 1 and the actual repetition into a single transmission. Such an embodiment may be applicable in case the transmission of priority index 1 is a PUCCH transmission and multiplexing of the UCI of priority index 1 on a PUSCH of priority index 0 is supported.

A WTRU may be configured or granted resources on which to transmit multiple TBs. Each TB may have a plurality of repetitions. The time resources for each repetition of each TB may be determined based on a mapping rule. The mapping rule may cycle all repetitions of a TB first before cycling through all repetitions of a subsequent TB. The mapping rule may cycle all the first repetitions of all TBs before cycling through all the second repetitions of all TBs.

Figure 9:
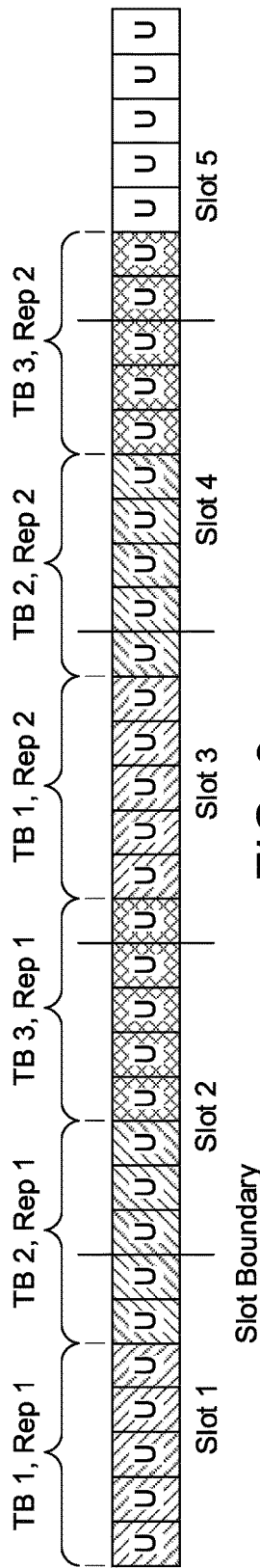
FIG. 9 shows an example mapping of repetitions using multi-TTI scheduling.

FIG. 9 shows an example of a mapping of repetitions when multi-TTI scheduling is used and transmission cycles per TB first, then per repetition. In FIG. 9, there are three TBs and each TB has two repetitions and each nominal transmission comprises five symbols. As shown in FIG. 9, repetitions of the TBs are transmitted (repetition 1 of TB 1, repetition 1 of TB 2, repetition 1 of TB 3), then second repetitions of the TBs are transmitted (repetition 2 of TB 1, repetition 2 of TB 2, repetition 2 of TB 3).

FIG. 10 shows an example of a mapping of repetitions when multi-TTI scheduling is used and transmission cycles per repetition first then per TB. In FIG. 10, there are three TBs and each TB has two repetitions and each nominal transmission comprises five symbols. As shown in FIG. 10, all repetitions of the first TB are transmitted (repetition 1 of TB 1, repetition 2 of TB 1), then all repetitions of the second TB are transmitted (repetition 1 of TB 2, repetition 2 of TB 2), then all repetitions of the third TB are transmitted (repetition 1 of TB 3, repetition 2 of TB 3).

Each of the repetitions shown in FIG. 9 and FIG. 10 may be nominal repetitions and a nominal repetition may be split or segmented into a plurality of actual repetitions. In FIG. 9, nominal repetition TB 2, rep 1 is split into two actual repetitions, nominal repetition TB 3, rep 1 is split into two actual repetitions, nominal repetition TB 2, rep 2 is split into two actual repetitions, and nominal repetition TB 3, rep 2 is split into two actual repetitions. In FIG. 10, nominal repetition TB 1, rep 2 is split into two actual repetitions, nominal repetition TB 2, rep 1 is split into two actual repetitions, nominal repetition TB 3, rep 1 is split into two actual repetitions, and nominal repetition TB 3, rep 2 is split into two actual repetitions.

For a case where a WTRU is scheduled with a single TB using repetitions, both embodiments (cycling per TB then per repetition of FIG. 9 and cycling per repetition first then per TB of FIG. 10) lead to the same result. Similarly, for the case where a WTRU is scheduled with a single repetition per TB, both embodiments (cycling per TB then per repetition of FIG. 9 and cycling per repetition first then per TB of FIG. 10) lead to the same result. In this case, a WTRU may transmit a set of TBs using sub-slot multi-TTI scheduling. This may enable the transmission of n TBs in m slots, where m<n.

In an embodiment, a WTRU may transmit a single TB per slot. In such a case, the nominal repetitions of a TB may be mapped to non-adjacent slots. For example, each TB may be configured or associated with a slot offset and periodicity. The slot periodicity may be fixed for some or all TBs. For example, a first TB may be mapped to slots with offset 0 and periodicity 3, a second TB may be mapped to slots with offset 1 and periodicity 3 and a third TB may be mapped to slots with offset 2 and periodicity 3. In such an example, if each TB has 3 repetitions, the first TB may have its repetitions mapped to slots 1, 4, 7, a second TB may have its repetitions mapped to slots 2, 5, 8 and a third TB may have its repetitions mapped to slots 3, 6, 9. In each slot, a TB may have a plurality of nominal or actual repetitions.

A WTRU may be configured with a table having elements that indicate a number of repetitions, a slot offset, a slot periodicity, and a number of TBs. A scheduling DCI may provide an index that points to a set of parameters found in the table.

Figure 11:
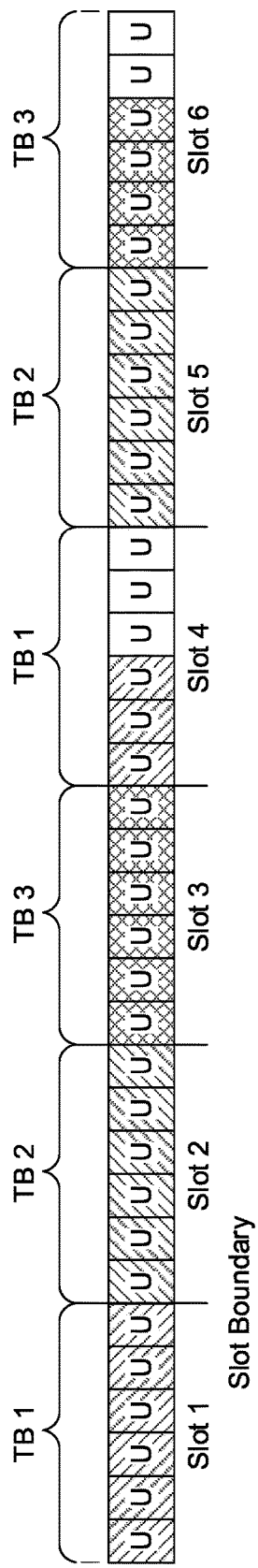
FIG. 11 shows an example repetition cycling with a single transport block per slot.

FIG. 11 shows an example of cycling with a single TB per slot. In this example, TB 1 has 3 repetitions of 3 symbols each, TB 2 has 3 repetitions of 4 symbols each and TB 3 has 5 repetitions of 2 symbols each. In some examples, all TBs scheduled with multi-TTI scheduling may have a same number of repetitions and a same number of symbols per repetition. In FIG. 11, TB1 is transmitted in slots 1 and 4, TB2 is transmitted in slots 2 and 5 and TB 3 is transmitted in slots 3 and 6. A nominal repetition of a TB may be split or segmented and may span a plurality of non-adjacent slots. For example, the second nominal repetition of TB2 in the example is split and a first actual repetition is transmitted in the second slot and the second actual repetition is transmitted in the fifth slot.

A WTRU may determine the elements of a repetition as a function of a number of repetitions or a number of different TBs in a slot. For example, the WTRU may transmit a single DM-RS in a slot if all repetitions within the slot are for the same TB.

A WTRU may be granted or configured to transmit multiple TBs and each TB may have a plurality of repetitions. The WTRU may receive an indication of a first HARQ process ID and may determine subsequent HARQ process IDs for subsequent TBs as a function of a cycling/mapping type. For example, HARQ process IDs may increment per slot or per repetition or per set of repetitions. The increment method and step size may be configurable or fixed or dynamically indicated.

For configured grant transmissions, a WTRU may indicate a HARQ process ID in a CG-UCI. The HARQ process ID indication may be provided in all CG-UCI or may be provided in a subset of CG-UCI transmissions. The incrementation method may be fixed or indicated by the WTRU in at least one CG-UCI.

In an embodiment, a WTRU may be granted or configured resources to transmit a repetition of a TB across multiple slots. For example, the WTRU may have a nominal repetition with a duration longer than that of a slot. In such a case, the WTRU may segment a repetition and transmit different parts of the TB in different actual repetitions. For example, a nominal repetition may be segmented into a plurality of actual repetitions and a TB may be segmented such that a portion of the TB is transmitted in each actual repetition associated to a nominal repetition.

In an embodiment, a WTRU may map each actual repetition to a single slot. The TDRA for each actual repetition within a nominal repetition may be fixed such that the same time resources are used in all the slots of a nominal repetition.

A WTRU may receive a HARQ-ACK for at least one TB of a set of TBs scheduled via multi-TTI scheduling. Upon reception of an ACK for a TB, the WTRU may not need to continue transmitting repetitions for that TB. In some embodiments, not transmitting repetitions for a single TB may lead to transmission gaps which may lead to a need to perform LBT prior to other repetitions.

A WTRU may reuse resources originally assigned to a first TB (e.g. for which it has received ACK) for the transmission of repetitions of a second TB. The second TB may be one for which the WTRU has already been transmitting some repetitions. The second TB may be a new TB for which the WTRU has not yet transmitted any repetition.

In an embodiment, a WTRU may shift remaining repetitions and TBs to use the resources that were originally assigned to the TB that has been acknowledged (ACKed).

In an embodiment, a WTRU may be assigned resources for repetitions of a HARQ process (e.g. rather than for a specific TB). The WTRU may receive an indication to transmit a new TB using a HARQ process for which it has received an ACK. The indication may be received by the WTRU in a same message it receives the ACK (e.g. CG-DFI). The indication may be received in a new DCI. The indication may be received via RRC signaling. The new TB may be transmitted using the repetition resources associated to the HARQ process. Different HARQ processes may be at a different repetition number. The WTRU may include an indication of the repetition number in an element of the repetition (e.g. CG-UCI).

In an embodiment, a WTRU may remap the remaining repetitions to take into account the newly free UL resources that were originally mapped to the ACKed TB. Such a remapping may be indicated to the WTRU or autonomously determined by the WTRU. Prior to remapping the remaining TBs, the WTRU may acknowledge the remapping to the gNB. In an embodiment, the WTRU may be triggered to transmit at least one element (e.g. CG-UCI or UCI) in a remapped repetition.

The WTRU may cycle through different TBs in a multi-TTI grant. Each TB may be mapped to a different slot and each slot may be associated with a different HARQ process. In a slot, the WTRU may include one or more repetitions for the associated HARQ process. The WTRU may or may not complete the required number of repetitions with that slot. Should the WTRU not complete the required number of repetitions, the WTRU may complete the transmission of the remaining repetitions on subsequent scheduled multi-TTI grants (or other grants).

For a given multi-TTI grant, a WTRU may perform transmissions on all TTIs after succeeding a single LBT for any of the TTIs. Upon LBT failure on a given TTI, the WTRU may attempt another LBT procedure for the next TTI. For a failed TB transmission attempt on a given TTI due to LBT, the WTRU may cycle to the next TB/HARQ process. The WTRU may skip or postpone the transmission of repetition(s) for which LBT failed and behave as though they were transmitted.

The WTRU may map a LBT-failed TB transmission to a next TTI or a different TTI in the grant if a HARQ process for the next TTI does not contain a pending TB (e.g. no other/previous pending TB was transmitted on the HARQ process associated with the slot) and/or the TB that failed LBT was not previously transmitted on a different HARQ process. The different TTI may be a first TTI available in the grant after the WTRU finishes cycling through the TBs. For example, the WTRU may append a TB repetition at the end after cycling through other HARQ processes (e.g. at the end of the grant). The WTRU may multiplex the HARQ process associated with the dropped TB/repetition part of UCI multiplexed on a PUSCH transmission This may depend or be based on if the selected TTI on which the TB/repetition is transmitted is associated with a different HARQ process than the one used to transmit the TB initially.

If multiple repetitions of a TB are transmitted before cycling to another TB, the WTRU may skip a repetition for which LBT failed. If TBs are all cycled first, the WTRU may delay a TB transmission until a next PUSCH occasion for which LBT succeeds. The WTRU may shift the transmission sequence by an offset upon LBT failure for transmitting a given repetition on a multi-TTI grant. The offset may be configured (e.g. by higher layers, RRC, or DCI) or predetermined as the number of repetitions per TB. In an example transmission (x.y), x may be the TB number and y may be the repetition number. The WTRU may transmit the following TB repetitions using a first cycling method assuming there are four TBs each repeated twice: 1.1 1.2 2.1 2.2 3.1 3.2 4.1 4.2. In a second cycling method, the WTRU may transmit the following TB repetitions: 1.1 2.1 3.1 4.1 1.2 2.2 3.2 4.2. If the WTRU uses the second cycling method and LBT fails for 1.1, the WTRU may skip the transmission of 2.1, since the WTRU may not transmit anything for the first TB until the fourth opportunity. The WTRU may shift the whole TB transmission sequence by an offset if LBT fails for transmitting a repetition.

A WTRU may be configured with a common SLIV/K for all TBs within a multi-slot transmission. Alternatively, SLIV/K may be individually configured per TB. Whether a common or TB-specific repetition configuration is used may depend on, for example, the number of TBs scheduled by a grant, traffic characteristics of the TBs (e.g. URLLC or eMBB), a method of signaling (or associated overhead) used to indicate the repetition parameters (e.g. via RRC table or DCI), or channel characteristics (e.g. reference signal received power (RSRP)).

The repetition parameters for each TB may depend on, for example, one or more of: characteristics of a TB (e.g. TB length or QoS requirements); resources scheduled for TB transmission (e.g. location of TB start/end within slot); relative location of consecutive TBs (e.g. in TDD scenario if two TBs are scheduled close together in time, a first TB may be restricted in a number of repetitions possible); a slot format of the slot within which a specific TB is transmitted; or channel characteristics (e.g. RSRP, channel occupancy).

The WTRU may select a SLIV/K common to all TBs or specific to each TB within a multi-slot grant via explicit indication in a scheduling DCI. The repetition characteristics may be indicated via an existing DCI format with one or more re-purposed spare bits, via an expanded DCI field, or via a new DCI. If only one configuration is present, or if the field used to indicate TB-specific repetition parameters is absent, the WTRU may interpret repetition parameters as common to all TBs scheduled via DCI.

The repetition parameters may be configured semi-statically (e.g. via RRC signaling) and stored via a table. The table may be individually configured, where a multi-slot scheduling DCI may indicate repetition parameters to be used for TBs within the grant via a pointer to a specific SLIV/K. A table (e.g. RRC table) may be used to indicate resources for multi-TB transmission and may indicate a repetition format/parameters for each TB.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
a transceiver; and
a processor, wherein:
the transceiver and the processor are configured to receive information to transmit uplink data, wherein the information indicates a first number of nominal repetitions and a first number of symbols for transmission in each of the first number of nominal repetitions;
the processor is further configured to determine a set of symbols associated with a first nominal repetition of the first number of nominal repetitions; and
the transceiver and the processor are further configured to transmit, based on the set of symbols associated with the first nominal repetition, a second number of actual repetitions in symbols associated with the first nominal repetition, wherein the second number of actual repetitions and the symbols used to transmit the second number of actual repetitions are based on an occurrence of an event during the set of symbols associated with the first nominal repetition, and wherein the second number of actual repetitions and the symbols used to transmit the second number of actual repetitions are based on whether a channel occupancy is initiated by the WTRU or whether the channel occupancy is initiated by a network entity.

2. The WTRU of claim 1, wherein the event is at least one of: a channel occupancy time (COT) end, channel access resources, channel access procedure outcome, a fixed frame period (FFP) idle period start time, or FFP idle period end time.

3. The WTRU of claim 1, wherein the set of symbols associated with the first nominal repetition comprises one or more subsets of consecutive uplink symbols.

4. The WTRU of claim 3, wherein each of the one or more subsets of consecutive uplink symbols comprises at least two symbols and wherein one subset of the one or more subsets of consecutive uplink symbols does not overlap with another subset of the one or more subsets of consecutive uplink symbols.

5. The WTRU of claim 4, wherein:
the transceiver and the processor are further configured, on a condition that the event occurs during the set of symbols associated with the first nominal repetition, to:
transmit a first actual repetition in one or more uplink symbols of the one or more subsets of consecutive uplink symbols prior to the occurrence of the event; and
on a condition that a channel access procedure is successful, transmit a second actual repetition after transmission of the first actual repetition in one or more uplink symbols of the one or more subsets of consecutive uplink symbols after the occurrence of the event.

6. The WTRU of claim 5, wherein the channel access procedure is based on at least one of: channel occupancy time (COT) timing, an initiator of a COT, a fixed frame period (FFP) timing, a previous channel access procedure outcome, whether a gap precedes a repetition, a size of a gap between repetitions, or a cause of a gap between repetitions.

7. The WTRU of claim 5, wherein the transceiver and the processor are further configured to receive configuration information regarding resources to perform the channel access procedure, wherein the resources comprise at least one of: a set of time instances, a set of frequency regions, or a beam.

8. The WTRU of claim 1, wherein the network entity is a gNB.

9. The WTRU of claim 1, wherein based on the event, one or more of the symbols of the second number of actual repetitions create a channel occupancy time (COT) gap for transmitting uplink control information (UCI) on a physical uplink control channel (PUCCH).

10. The WTRU of claim 1, wherein an actual repetition of the second number of actual repetitions comprise at least one of: a configured grant-uplink control information (CG-UCI), a demodulation reference signal (DM-RS), a scheduling request (SR), a channel state information (CSI), a hybrid automatic repeat request (HARQ) acknowledgement (ACK), or a transport block (TB).

11. A method for use in a wireless transmit/receive unit (WTRU), the method comprising:
receiving information to transmit uplink data, wherein the information indicates a first number of nominal repetitions and a first number of symbols for transmission in each of the first number of nominal repetitions;
determining a set of symbols associated with a first nominal repetition of the first number of nominal repetitions; and
transmitting, based on the set of symbols associated with the first nominal repetition, a second number of actual repetitions in symbols associated with the first nominal repetition, wherein the second number of actual repetitions and the symbols used to transmit the second number of actual repetitions are based on an occurrence of an event during the set of symbols associated with the first nominal repetition, and wherein the second number of actual repetitions and the symbols used to transmit the second number of actual repetitions are based on whether a channel occupancy is initiated by the WTRU or whether the channel occupancy is initiated by a network entity.

12. The method of claim 11, wherein the event is at least one of: a channel occupancy time (COT) end, channel access resources, channel access procedure outcome, a fixed frame period (FFP) idle period start time, or FFP idle period end time.

13. The method of claim 11, wherein the set of symbols associated with the first nominal repetition comprises one or more subsets of consecutive uplink symbols.

14. The method of claim 13, wherein each of the one or more subsets of consecutive uplink symbols comprises at least two symbols and wherein one subset of the one or more subsets of consecutive uplink symbols does not overlap with another subset of the one or more subsets of consecutive uplink symbols.

15. The method of claim 14, further comprising:
transmitting, based on the event occurs during the set of symbols associated with the first nominal repetition, a first actual repetition in one or more uplink symbols of the one or more subsets of consecutive uplink symbols prior to the occurrence of the event; and
transmitting, based on a channel access procedure being successful, a second actual repetition after transmission of the first actual repetition in one or more uplink symbols of the one or more subsets of consecutive uplink symbols after the occurrence of the event.

16. The method of claim 15, wherein the channel access procedure is based on at least one of: channel occupancy time (COT) timing, an initiator of a COT, a fixed frame period (FFP) timing, a previous channel access procedure outcome, whether a gap precedes a repetition, a size of a gap between repetitions, or a cause of a gap between repetitions.

17. The method of claim 15, further comprising receiving configuration information regarding resources for performing the channel access procedure, wherein the resources comprise at least one of: a set of time instances, a set of frequency regions, or a beam.

18. The method of claim 11, wherein the network entity is a gNB.

19. The method of claim 11, wherein based on the event, one or more of the symbols of the second number of actual repetitions create a channel occupancy time (COT) gap for transmitting uplink control information (UCI) on a physical uplink control channel (PUCCH).

20. The method of claim 11, wherein an actual repetition of the second number of actual repetitions comprise at least one of: a configured grant-uplink control information (CG-UCI), a demodulation reference signal (DM-RS), a scheduling request (SR), a channel state information (CSI), a hybrid automatic repeat request (HARQ) acknowledgement (ACK), or a transport block (TB).

* * * * *